(12) United States Patent  
Mullins et al.

(10) Patent No.: US 9,223,742 B2
(45) Date of Patent: *Dec. 29, 2015

(54) DATA STRUCTURES FOR FACILITATING COMMUNICATION BETWEEN A HOST DEVICE AND AN ACCESSORY

(71) Applicant: Apple Inc., Cupertino, CA (US)

(72) Inventors: Scott Mullins, Morgan Hill, CA (US); Alexei Kosut, Mountain View, CA (US); Scott Krueger, San Francisco, CA (US); John Ananny, San Anselmo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/679,999

(22) Filed: Nov. 16, 2012

(65) Prior Publication Data

US 2014/0075069 A1    Mar. 13, 2014

Related U.S. Application Data

(63) Continuation of application No. 13/607,426, filed on Sep. 7, 2012.

(51) Int. Cl.  
*G06F 3/00* (2006.01)  
*G06F 13/42* (2006.01)  
*H04M 1/02* (2006.01)  
*H01R 24/60* (2011.01)

(52) U.S. Cl.  
CPC .............. *G06F 13/4286* (2013.01); *G06F 3/00* (2013.01); *G06F 13/4269* (2013.01); *H04M 1/0274* (2013.01); *H01R 24/60* (2013.01)

(58) Field of Classification Search  
USPC ................. 710/16, 63, 64, 105, 305, 313, 315  
See application file for complete search history.

(56) References Cited

U.S. PATENT DOCUMENTS

| 4,792,986 | A | | 12/1988 | Garner et al. |
| 4,968,929 | A | | 11/1990 | Hauck et al. |
| 5,387,110 | A | | 2/1995 | Kantner et al. |
| 5,442,243 | A | | 8/1995 | Bailey |
| 6,012,105 | A | * | 1/2000 | Rubbmark et al. ............ 710/14 |
| 6,073,201 | A | * | 6/2000 | Jolley et al. .................. 710/315 |

(Continued)

FOREIGN PATENT DOCUMENTS

DE    202004012084 U1    11/2004  
FR         2138961 A1    1/1973

(Continued)

OTHER PUBLICATIONS

Non-Final Office Action for U.S. Appl. No. 13/232,989, mailed on Feb. 24, 2012, 9 pages.

(Continued)

*Primary Examiner* — Khanh Dang  
(74) *Attorney, Agent, or Firm* — Kilpatrick Townsend & Stockton LLP

(57) ABSTRACT

Computer readable storage mediums, electronic devices, and accessories having stored thereon data structures. A data structure includes a pin selection field operable to identify a connector pin and cause a host device to select one of a plurality of communication protocols for communicating with an accessory over the identified connector pin. The data structure also includes an accessory capability field defining an accessory identifier that uniquely identifies the accessory.

12 Claims, 14 Drawing Sheets

(56) References Cited

U.S. PATENT DOCUMENTS

| | | | |
|---|---|---|---|
| 6,145,037 A | 11/2000 | Sakakibara | |
| 6,334,160 B1* | 12/2001 | Emmert et al. | 710/11 |
| 6,368,146 B2 | 4/2002 | Abbott | |
| 6,452,402 B1 | 9/2002 | Kerai | |
| 6,671,814 B1 | 12/2003 | Kubo et al. | |
| 6,718,417 B1 | 4/2004 | Bachrach | |
| 6,810,435 B2* | 10/2004 | Palmer et al. | 710/8 |
| 6,836,814 B2 | 12/2004 | Takaoka et al. | |
| 6,973,658 B2 | 12/2005 | Nguyen | |
| 6,981,887 B1 | 1/2006 | Mese et al. | |
| 7,039,731 B2 | 5/2006 | Hasegawa | |
| 7,058,075 B1 | 6/2006 | Wong et al. | |
| 7,094,086 B2 | 8/2006 | Teicher | |
| 7,104,848 B1* | 9/2006 | Chou et al. | 439/660 |
| 7,123,022 B2 | 10/2006 | Parker et al. | |
| 7,216,191 B2 | 5/2007 | Sagues et al. | |
| 7,277,966 B2 | 10/2007 | Hanson et al. | |
| 7,392,946 B2 | 7/2008 | Hellström et al. | |
| 7,442,091 B2 | 10/2008 | Salolmon et al. | |
| 7,458,825 B2 | 12/2008 | Atsmon et al. | |
| 7,463,042 B2 | 12/2008 | Pereira | |
| 7,496,671 B2 | 2/2009 | Engel et al. | |
| 7,529,870 B1* | 5/2009 | Schubert et al. | 710/105 |
| 7,533,202 B2* | 5/2009 | Newman | 710/64 |
| 7,565,458 B2* | 7/2009 | Thijssen et al. | 710/16 |
| 7,577,887 B2* | 8/2009 | Kim | 714/727 |
| 7,589,536 B2 | 9/2009 | Terlizzi et al. | |
| 7,716,400 B2 | 5/2010 | Raines | |
| 7,717,717 B1 | 5/2010 | Lai | |
| 7,743,187 B2* | 6/2010 | Choi et al. | 710/64 |
| 7,863,906 B2 | 1/2011 | Terlizzi et al. | |
| 7,890,284 B2 | 2/2011 | Patterson et al. | |
| 7,969,702 B2* | 6/2011 | Herrmann | 361/93.1 |
| 2003/0068033 A1 | 4/2003 | Kiko | |
| 2003/0220988 A1* | 11/2003 | Hymel | 709/220 |
| 2004/0023560 A1 | 2/2004 | Swoboda | |
| 2005/0015525 A1* | 1/2005 | Cahill et al. | 710/62 |
| 2005/0021890 A1* | 1/2005 | Baker et al. | 710/62 |
| 2005/0097212 A1 | 5/2005 | Engel et al. | |
| 2005/0246477 A1* | 11/2005 | Adams et al. | 710/315 |
| 2006/0047861 A1* | 3/2006 | Hung et al. | 710/11 |
| 2006/0047982 A1 | 3/2006 | Lo et al. | |
| 2006/0156415 A1* | 7/2006 | Rubinstein et al. | 726/27 |
| 2007/0001691 A1 | 1/2007 | Pereira | |
| 2007/0082634 A1* | 4/2007 | Thijssen et al. | 455/169.1 |
| 2007/0178771 A1 | 8/2007 | Goetz et al. | |
| 2007/0245058 A1 | 10/2007 | Wurzburg et al. | |
| 2007/0287302 A1 | 12/2007 | Lindberg et al. | |
| 2008/0164934 A1 | 7/2008 | Hankey et al. | |
| 2008/0167828 A1 | 7/2008 | Terlizzi et al. | |
| 2008/0274633 A1 | 11/2008 | Teicher | |
| 2008/0320190 A1 | 12/2008 | Lydon et al. | |
| 2009/0092378 A1 | 4/2009 | Ho et al. | |
| 2009/0108848 A1 | 4/2009 | Lundquist et al. | |
| 2009/0132076 A1* | 5/2009 | Holden et al. | 700/94 |
| 2009/0193180 A1 | 7/2009 | Ito | |
| 2009/0290725 A1 | 11/2009 | Huang | |
| 2010/0042826 A1 | 2/2010 | Bull et al. | |
| 2010/0075604 A1* | 3/2010 | Lydon et al. | 455/41.3 |
| 2010/0161842 A1* | 6/2010 | Shan et al. | 710/18 |
| 2010/0180063 A1* | 7/2010 | Ananny et al. | 710/315 |
| 2010/0279554 A1 | 11/2010 | Steijner | |
| 2011/0055407 A1 | 3/2011 | Lydon et al. | |
| 2011/0167176 A1 | 7/2011 | Yew et al. | |
| 2012/0042347 A1 | 2/2012 | Yasuda | |
| 2012/0047368 A1 | 2/2012 | Chinn et al. | |
| 2012/0188916 A1 | 7/2012 | Miyake et al. | |
| 2012/0231835 A1* | 9/2012 | Zhang et al. | 455/552.1 |
| 2012/0265911 A1* | 10/2012 | Connolly | 710/300 |
| 2013/0128933 A1 | 5/2013 | Hsu et al. | |
| 2014/0075067 A1 | 3/2014 | Mullins et al. | |
| 2014/0270201 A1 | 9/2014 | Kocalar et al. | |

FOREIGN PATENT DOCUMENTS

| | | |
|---|---|---|
| JP | 6155974 A | 6/1994 |
| JP | 2003-217728 A | 7/2003 |
| WO | 2005/013436 A1 | 2/2005 |
| WO | 2006/013553 A2 | 2/2006 |
| WO | 2008/065659 A2 | 6/2008 |
| WO | 2009/069969 A2 | 6/2009 |

OTHER PUBLICATIONS

Non-Final Office Action for U.S. Appl. No. 13/232,989, mailed on May 25, 2012, 22 pages.

Non-Final Office Action for U.S. Appl. No. 13/232,978, mailed on May 7, 2012, 18 pages.

Final Office Action for U.S. Appl. No. 13/232,978, mailed on Nov. 6, 2012, 32 pages.

Final Office Action for U.S. Appl. No. 13/607,426 mailed on Apr. 8, 2014, 17 pages.

Notice of Allowance for U.S. Appl. No. 13/607,426 mailed on May 12, 2014, 5 pages.

International Search Report and Written Opinion for International PCT Application No. PCT/US2013/037938, mailed Sep. 13, 2013, 20 pages.

Extended European Search Report, EP App. No. 13165082.2, mailed Sep. 24, 2013, 7 pages.

Non-Final Office Action for U.S. Appl. No. 13/607,426 mailed on Nov. 14, 2013, 20 pages.

International Preliminary Report on Patentability for International PCT Application No. PCT/US2013/037938, mailed Mar. 19, 2015, 14 pages.

* cited by examiner

| ACC1 | Data A+ | Data A- | P_IN | P_IN | Data B- | Data B+ | ACC2 |
|---|---|---|---|---|---|---|---|
| 206(1) | 206(2) | 206(3) | 206(4) | 206(5) | 206(6) | 206(7) | 206(8) |

Fig. 2E

| GND | Data A+ | Data A- | ACC1 | P_IN | Data B- | Data B+ | ACC2 |
|---|---|---|---|---|---|---|---|
| 206(1) | 206(2) | 206(3) | 206(4) | 206(5) | 206(6) | 206(7) | 206(8) |

Fig. 2F

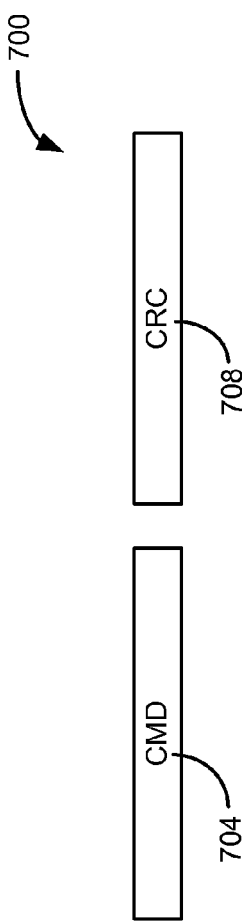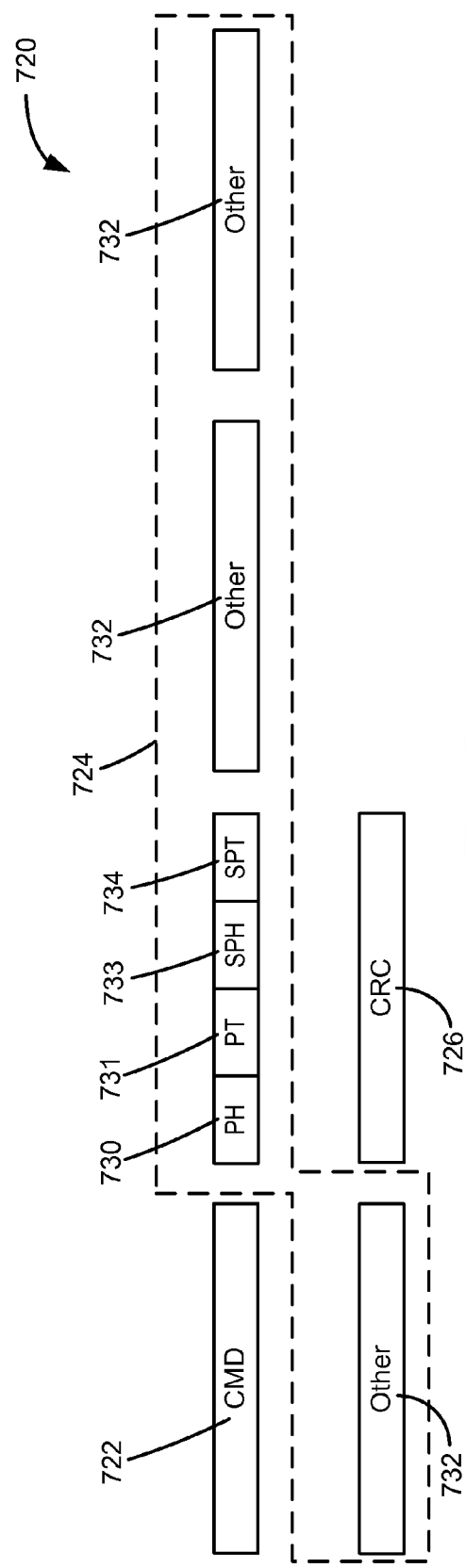

DATA STRUCTURES FOR FACILITATING COMMUNICATION BETWEEN A HOST DEVICE AND AN ACCESSORY

CROSS-REFERENCES TO RELATED APPLICATIONS

This application is a continuation of U.S. patent application Ser. No. 13/607,426, filed Sep. 7, 2012, the contents of which are incorporated by reference herein in their entirety for all purposes. This application is related to U.S. patent application Ser. No. 13/607,550, filed on Sep. 7, 2012, entitled "TECHNIQUES FOR CONFIGURING CONTACTS OF A CONNECTOR", the contents of which are incorporated by reference herein in their entirety for all purposes.

BACKGROUND

Connectors are ubiquitous and are used in a variety of applications for coupling two electronic devices. Most connectors usually have some sort of contacts that facilitate the transmission of signals between the devices connected using the connectors. Conventionally, each contact in a connector has a specific pre-assigned function. In other words, each contact in a connector is designated to carry a specific type of signal, e.g., power, ground, data for a particular communication interface (USB 2.0, USP 3.0, Thunderbolt, etc), etc.

SUMMARY

Embodiments of the present invention generally relate to connectors for connecting two devices and, more specifically, to data structures for facilitating communication between two devices including the configuring of pins of those connectors. As described above, conventional connectors have contacts that have pre-assigned functions. For example, in a standard USB 2.0 connector, each of the four contacts has a specific function associated with it, e.g., power, data positive, data negative, and ground. The location of these pre-assigned contacts within the connector is also fixed. In sum, the contacts in such conventional connectors are not configurable and can perform only the pre-assigned function based on the type and use of the connector.

In various embodiments, a host device may be operable to connect to various accessories via the same host connector, where the host device does not know, prior to connection, the specific function of some or all of the contacts of a connected accessory connector. Upon connecting the host device to the accessory, the accessory may send pin configuration information to the host device. The host device may then configure its pins accordingly so as to facilitate communication, data transfer, power transfer, etc. with the accessory. In addition to pin configuration information, the accessory may also send information indicating capabilities of the accessory, such as the speed of a communication protocol by which the accessory may communicate with the host device. The host device may use such information to further facilitate communication and/or inter-device operation (such as accessory and/or host device power charging) between the host device and the accessory.

Certain embodiments provide various data structures for communicating pin configuration information from an accessory to a host device. For example, the accessory may send an information string having a particular data structure to the host device. The information string may include a pin selection field operable to identify a connector pin and cause a host device to select one of a plurality of communication protocols for communicating with an accessory over the identified connector pin, and an accessory capability field defining one or more capabilities of the accessory.

Other embodiments provide various data structures for communicating commands between a host device and an accessory. For example, the host device may send an information string having a particular data structure to the accessory. The information string may include a first break field, a command field, a cyclic redundancy check field, and a second break field. The first break field may be operable to cause an accessory to reset into a known state. The command field may define a command operable to cause the accessory to perform a function and provide a response to a host device unique to the command, the command being at least one of a request to identify a connector pin and select one of a plurality of communication protocols for communicating over the identified connector pin, a request to set a state of the accessory, and a request to get a state of the accessory. The second break field may indicate to the accessory the end of the data structure.

In some embodiments, the connectors may be single-orientation connectors, whereby they can mate with one another in only one orientation. In other embodiments, the connectors may be multi-orientation connectors (e.g., reversible connectors), whereby they can mate with one another in two or more orientations.

The following detailed description, together with the accompanying drawings will provide a better understanding of the nature and advantages of the present invention.

BRIEF DESCRIPTION OF THE DRAWINGS

FIGS. 2E and 2F are diagrams illustrating a pinout arrangement of a receptacle connector according to two different embodiments of the invention configured to mate with plug connectors 100 and 101, respectively, as shown in FIGS. 1D and 1E.

FIG. 7A illustrates a detailed structure for a portion of a command sequence for requesting a state of an accessory according to an embodiment of the present invention.

FIG. 7B illustrates a detailed structure of a response sequence for responding to a request for a state of the accessory according to an embodiment of the present invention.

DETAILED DESCRIPTION

Embodiments of the present invention generally relate to connectors. More specifically, certain embodiments of the present invention provide data structures for facilitating communication between a host device and an accessory.

Figure 1A:
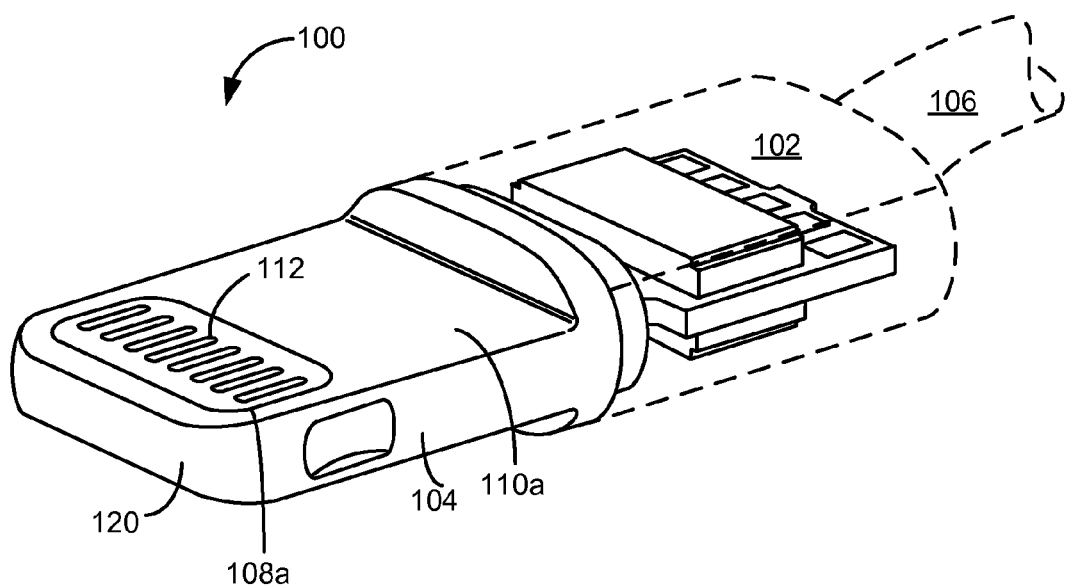
FIG. 1A illustrates a plug connector according to an embodiment of the present invention.

FIG. 1A illustrates a plug connector 100 according to an embodiment of the present invention. Plug connector 100 is exemplary and is used herein to explain the various embodiments of the present invention. One skilled in the art will realize that many other forms and types of connectors other than plug connector 100 can be used and that techniques described herein will apply to any plug connector that has the characteristics of plug connector 100.

Plug connector 100 includes a body 102 and a tab portion 104. A cable 106 is attached to body 102 and tab portion 104 and extends away from body 102 in a direction parallel to the length of the connector 100. Tab 104 is sized to be inserted into a corresponding receptacle connector during a mating event and includes a first contact region 108a formed on a first major surface 110a and a second contact region 108b (not shown in FIG. 1A) formed at a second major surface 110b (not shown in FIG. 1A) opposite surface 110a. A plurality of contacts 112 can be formed in each of contact regions 108a and 108b such that, when tab 104 is inserted into a corresponding receptacle connector, contacts 112 in regions 108a and/or 108b are electrically coupled to corresponding contacts in the receptacle connector. In some embodiments, contacts 112 are self-cleaning wiping contacts that, after initially coming into contact with a receptacle connector contact during a mating event, slide further past the receptacle connector contact with a wiping motion before reaching a final, desired contact position.

Figure 1B:
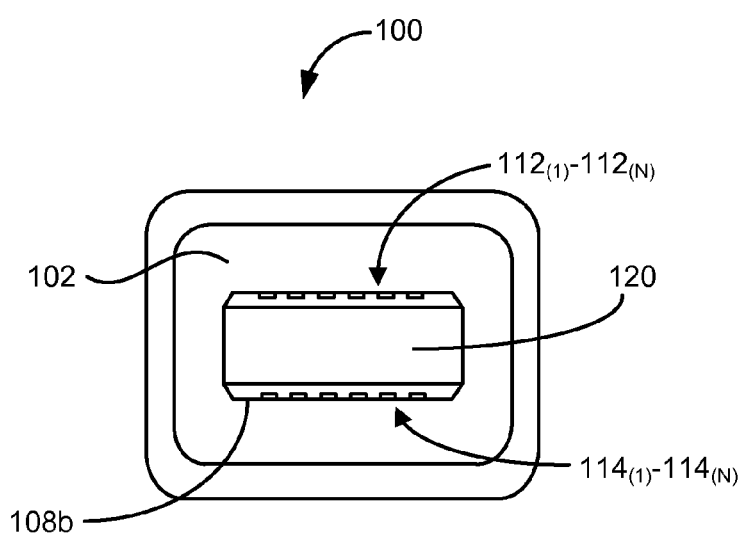
FIG. 1B is a simplified, cross-sectional view of the plug connector of FIG. 1A taken through the array of contacts.

FIG. 1B illustrates a simplified, cross-sectional view of plug connector 100. The front view illustrates a cap 120. Cap 120 can be made from a metal or other conductive material and can extend from the distal tip of connector 100 along the side of the connector towards body 102 either fully or partially surrounding contacts 112 formed in contact regions 108a and 108b in the X and Y directions. In some embodiments, cap 120 can be grounded in order to minimize interference that may otherwise occur on contacts 112 of connector 100 and can thus be referred to as a ground ring. Contacts $112_{(1)}$-$112_{(N)}$ can be positioned within contact region 108a and additional contacts $114_{(1)}$-$114_{(N)}$ can be positioned within region 108b on the opposing surface of tab 104. In some embodiments, N can be between 2 and 8.

Figure 1C:
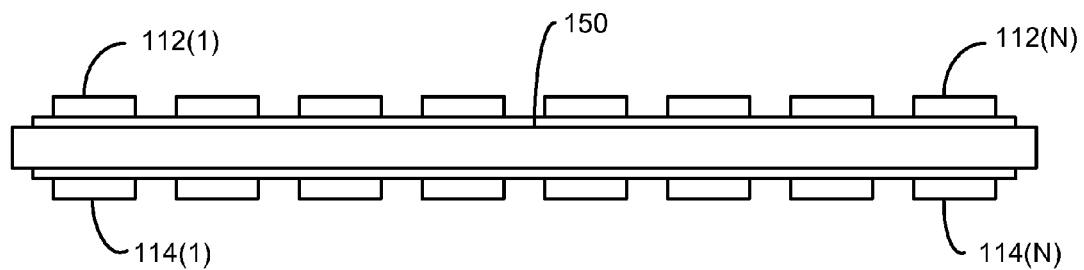
FIG. 1C is a cross-sectional schematic view of the plug connector of FIG. 1A.

FIG. 1C illustrates a cross-sectional schematic view of contacts 112, 114 and positioning of the contacts. Contacts 112, 114 can be mounted on either side of a PCB 150. In some embodiments, contacts 112, 114 are part of a reversible or dual orientation unpolarized plug connector that can be mated with a corresponding receptacle connector in either of two orientations. In other embodiments, contacts 112, 114 are part of a polarized plug connector that can be mated with a corresponding receptacle connector in only a single orientation. Contacts 112, 114 can be made from a copper, nickel, brass, a metal alloy or any other appropriate conductive material. In some embodiments, spacing may be consistent between each of the contacts on the front and back sides and between the contacts and the edges of the connector providing 180 degree symmetry so that plug connector 300 can be inserted into and electrically mated with a corresponding receptacle connector in either of two orientations. When connector 100 is properly engaged with a receptacle connector, each of contacts $112_{(1)}$-$112_{(N)}$ and/or $114_{(1)}$-$114_{(N)}$ is in electrical connection with a corresponding contact of the receptacle connector.

Figure 1D:
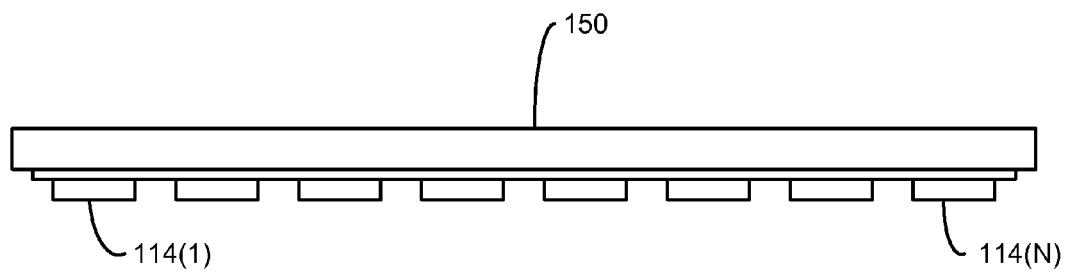
FIG. 1D is a cross-sectional schematic view of a single-sided plug connector according to an embodiment of the present invention.

It should be recognized that embodiments are not limited to a plug connector including contacts mounted on opposite sides. Rather, in some embodiments, contacts may be mounted on only one side of the plug connector. FIG. 1D illustrates an embodiment where contacts $114_{(1)}$-$114_{(N)}$ are mounted on only one side of PCB 150. In such a case, when connector 100 is properly engaged with a receptacle connector, each of contacts $114_{(1)}$-$114_{(N)}$ are in electrical connection with a corresponding contact of the receptacle connector.

Figure 1E:
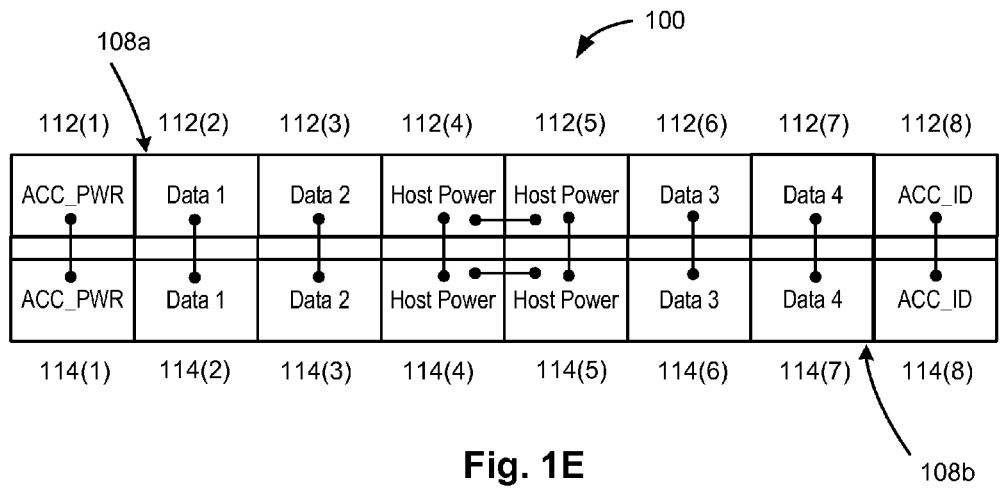
FIG. 1E is a pin-out of a plug connector according to an embodiment of the present invention.

FIG. 1E illustrates a pin-out configuration for connector 100 according to one particular embodiment of the present invention as described in connection with FIG. 1C above.

The pin-out shown in FIG. 1E includes four contacts 112(4), 112(5), 114(4), and 114(5) that are electrically coupled together to function as a single contact dedicated to carrying power to a connected host device. Connector 100 may also include accessory ID contacts 112(8) and 114(8); accessory power contacts 112(1) and 114(1); and eight data contacts arranged in four pairs. The four pairs of data contacts may be (a) 112(2) and 112(3), (b) 112(6) and 112(7), (c) 114(2) and 114(3), and (d) 114(6) and 114(7). Host power contacts 112(4), 112(5), 114(4), and 114(5) carry power from an accessory associated with connector 100 to a portable electronic device that is coupled to the accessory via connector 100. The host power contacts can be sized to handle any reasonable power requirement for an electronic device or host device, and for example, can be designed to carry between 3-20 Volts from an accessory to charge the portable electronic device connected to connector 100. In this embodiment, host power contacts 112(4), 112(5), 114(4), and 114(5) are positioned in the center of contact regions 108a, 108b to improve signal integrity by keeping power as far away as possible from the sides of ground ring 105.

Accessory power contacts 112(1) and 114(1) can be used for an accessory power signal that provides power from the electronic device (i.e. the host device) to an accessory. The accessory power signal is typically a lower voltage signal than the host power in signal received over host power contacts 112(4) and 112(5), for example, 3.3 volts as compared to 5 volts or higher. The accessory ID contacts provide a communication channel that enables the host device to authenticate the accessory and enable the accessory to communicate information to the host device about the accessory's capabilities as described in more detail below.

The four pairs of data contacts (a) 112(2) and 112(3), (b) 112(6) and 112(7), (c) 114(2) and 114(3), and (d) 114(6) and 114(7) may be used to enable communication between the host and accessory using one or more of several different communication protocols. For example, data contacts 112(2) and 112(3) are positioned adjacent to and on one side of the power contacts, while data contacts 112(6) and 112(7) are positioned adjacent to but on the other side of the power contacts. A similar arrangement of contacts can be seen for contacts 114 on the other surface of the PCB. The accessory power and accessory ID contacts are positioned at each end of the connector. The data contacts can be high speed data contacts that operate at a rate that is two or three orders of magnitude faster than any signals sent over the accessory ID contact which makes the accessory ID signal look essentially like a DC signal to the high speed data lines. Thus, positioning the data contacts between the power contacts and the ID contact improves signal integrity by sandwiching the data contacts between contacts designated for DC signals or essentially DC signals.

Figure 1F:
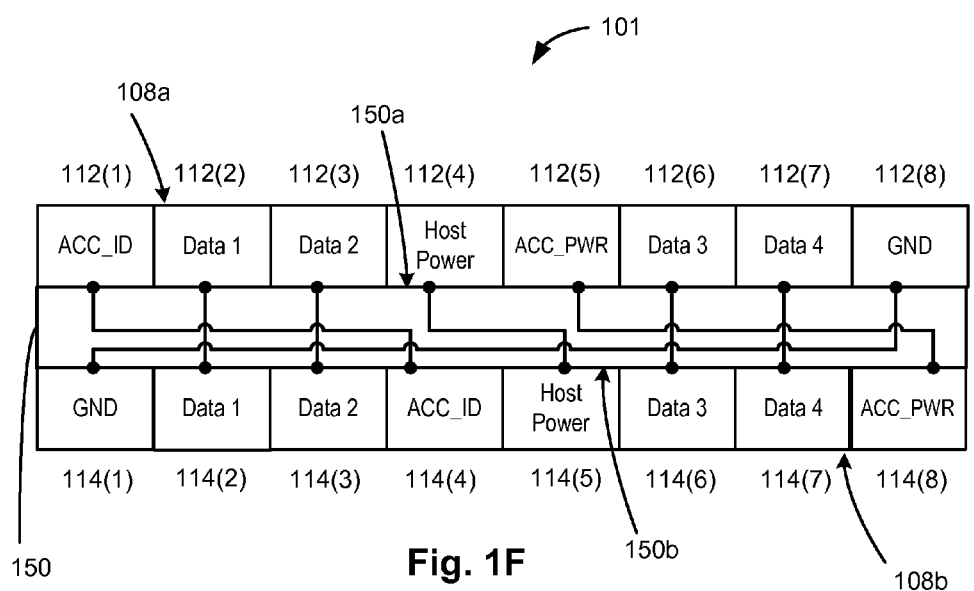
FIG. 1F is a pin-out of a plug connector according to another embodiment of the present invention.

FIG. 1F illustrates a pin-out configuration for a connector 101 according to another particular embodiment of the present invention.

Connector 101 is also a reversible connector just like connector 100. In other words, based on the orientation in which connector 101 is mated with a corresponding connector of a host device, either the contacts on the surface 108a or 108b are in physical and electrical contact with the contacts in the corresponding connector of the host device. As illustrated in FIG. 1F, connector 101 may have eight contacts arranged on an upper surface 150a of a PCB 150 and eight contacts arranged on a lower surface 150b of PCB 150.

Connector 101 includes two contacts 112(1) and 114(4) that can function as accessory ID contacts to carry the identification signals between the accessory and the portable electronic device. Contacts 112(1) and 114(4) are electrically connected to each other as illustrated in FIG. 1F. Connector 101 can have four pairs of data contacts, (a) 112(2) and 112(3), (b) 112(6) and 112(7), (c) 114(2) and 114(3), and (d) 114(6) and 114(7). In this particular embodiment, opposing data contacts, e.g., 112(2) and 114(2), are electrically connected to each other via PCB 150 as illustrated in FIG. 1E. Connector 101 may further include host power contacts 112(4) and/or 114(5) that may be electrically connected to each other. Host power contacts 112(4) and 114(5) can carry power to the host device that is mated with connector 101. For example, plug connector 101 may be part of a power supply system designed to provide power to the host device. In this instance, either contact 112(4) or 114(5) may carry power from the power supply to the host device, e.g., to charge a battery in the host device.

Connector 101 may further include accessory power contacts 112(5) and 114(8) that may be electrically connected to each other, e.g., via PCB 150. Accessory power contacts carry power from the host device to a connected accessory. For example, in some instances, an accessory connected to the host device may not be self-powered and may derive its power from the host device. In this instance, the host device can supply power to the accessory over either of the accessory contacts, depending on the orientation of connector 101 with respect to a corresponding connector of the host device. Connector 101 may further include two ground contacts 112(8) and 114(1) electrically connected to each other. The ground contacts provide a ground path for connector 101.

In one embodiment, the pinout of FIG. 1E represents the signal assignments of a plug connector 100 in a plug connector/receptacle connector pairing that can be the primary physical connector system for an ecosystem of products that includes both host electronic devices and accessory devices. In another embodiment, the pinout of FIG. 1F represents such signal assignments. Examples of host devices include smart phones, portable media players, tablet computers, laptop computers, desktop computers and other computing devices. An accessory can be any piece of hardware that connects to and communicates with or otherwise expands the functionality of the host. Many different types of accessory devices can be specifically designed or adapted to communicate with the host device through connector 100 to provide additional functionality for the host. Plug connector 100 can be incorporated into each accessory device that is part of the ecosystem to enable the host and accessory to communicate with each other over a physical/electrical channel when plug connector 100 from the accessory is mated with a corresponding receptacle connector in the host device. Examples of accessory devices include docking stations, charge/sync cables and devices, cable adapters, clock radios, game controllers, audio equipment, memory card readers, headsets, video equipment and adapters, keyboards, medical sensors such as heart rate monitors and blood pressure monitors, point of sale (POS) terminals, as well as numerous other hardware devices that can connect to and exchange data with the host device.

It can be appreciated that some accessories may want to communicate with the host device using different communication protocols than other accessories. For example, some accessories may want to communicate with the host using a differential data protocol, such as USB 2.0, while other accessories may want to communicate with the host using an asynchronous serial communication protocol. In one embodiment data contacts 112(2), 112(3), 112(6) and 112(7) can be dedicated to two pairs of differential data contacts, two pairs of serial transmit/receive contacts, or one pair of differential data contacts and one pair of serial transmit/receive contacts depending on the purpose of connector 100 or function of the accessory connector 100 is part of. As an example that is particularly useful for consumer-oriented accessories and devices, the four data contacts can accommodate two of the following three communication interfaces: USB 2.0, Mikey Bus or a universal asynchronous receiver/transmitter (UART) interface. As another example that is particularly usefully for debugging and testing devices, the set of data contacts can accommodate two of either USB 2.0, UART or a JTAG communication protocols. In each case, the actual communication protocol that is used to communicate over a given data contact can depend on the accessory as discussed below.

As mentioned above, connector 100 may include one or more integrated circuits that provide information regarding the connector and any accessory or device it is part of and/or perform specific functions. The integrated circuits may include circuitry that participates in a handshaking algorithm that communicates the function of one or more contacts to a host device that connector 100 is mated with. For example, an ID module can be embodied within an IC as discussed below and operatively coupled to the ID contact, contact 112(8) in each of the pinouts in FIGS. 1E and 1F, and an authentication module can be embodied in the IC with the ID module or in a separate IC. The ID and authentication modules each include a computer-readable memory that can be programmed with identification, configuration and authentication information relevant to the connector and/or its associated accessory that can be communicated to a host device during a mating event. For instance, when connector 100 is mated with a receptacle connector in a host electronic device, the host device may send a command over its accessory ID contact (that is positioned to align with the ID contact of the corresponding plug connector) as part of a handshaking algorithm to determine if the accessory is authorized to communicate and operate with the host. The ID module can receive and respond to the command by sending a predetermined response back over the ID contact. The response may include information that identifies the type of accessory or device that connector 100 is part of as well as various capabilities or functionalities of the device. The response may also communicate to the host device what communication interface or communication protocol the connector 100 employs on each of data contact pairs 112(2), 112(3), 112(6) and 112(7). If connector 100 is part of a USB cable, for example, the response sent by the ID module may include information that tells the host device that contacts 112(2) and 112(3) are USB differential data contacts. If connector 100 is a headset connector, the response may include information that tells the host that contacts 112(6) and 112(7) are Mikey Bus contacts. Switching circuitry within the host can then configure the host circuitry operatively coupled to the contacts in the receptacle connector accordingly as discussed below.

Figure 2A:
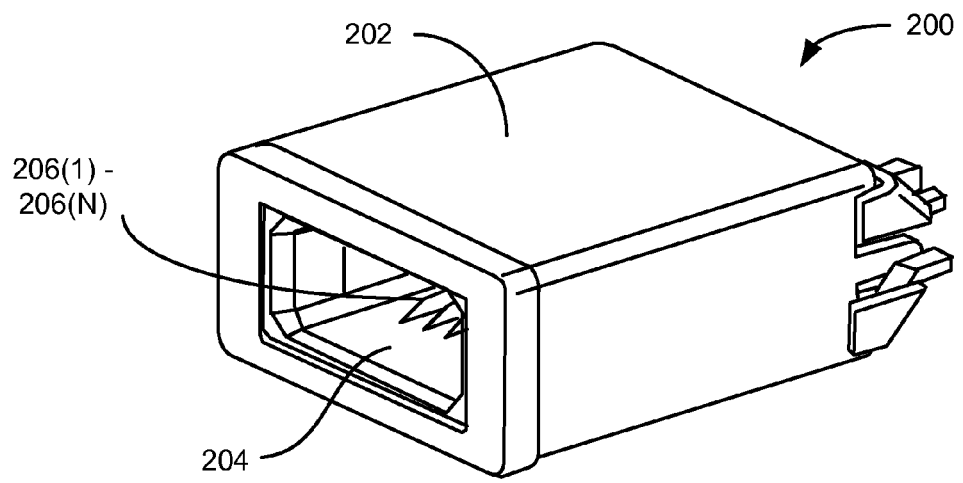
FIG. 2A illustrates a receptacle connector according to an embodiment of the present invention.

FIG. 2A illustrates a receptacle connector 200 according to an embodiment of the present invention. Receptacle connector 200 includes a housing 202 that defines a cavity 204 and houses N contacts $206_{(1)}$-$206_{(N)}$ within the cavity. In operation, a connector plug, such as plug connector 100 (or connector 101) can be inserted into cavity 204 to electrically couple the contacts $112_{(1)}$-$112_{(N)}$ and/or $114_{(1)}$-$114_{(N)}$ to respective contacts $206_{(1)}$-$206_{(N)}$. Each of the receptacle contacts $206_{(1)}$-$206_{(N)}$ electrically connects its respective plug contact to circuitry associated with the electrical device in which receptacle connector 200 is housed. For example, receptacle connector 200 can be part of a portable media device and electronic circuitry associated with the media device is electrically connected to receptacle 200 by soldering tips of contacts $206_{(1)}$-$206_{(N)}$ that extend outside housing 202 to a multilayer board such as a printed circuit board (PCB) within the portable media device. Note that receptacle connector 200 is designed to be mated with a dual orientation, reversible plug connector and includes contacts on just a single side so the receptacle connector (and the electronic device the receptacle connector is part of) can be made thinner. In other embodiments, connector 200 may have contacts on each side while connector 100 may only have contacts on a single side or on both sides.

Figure 2B:
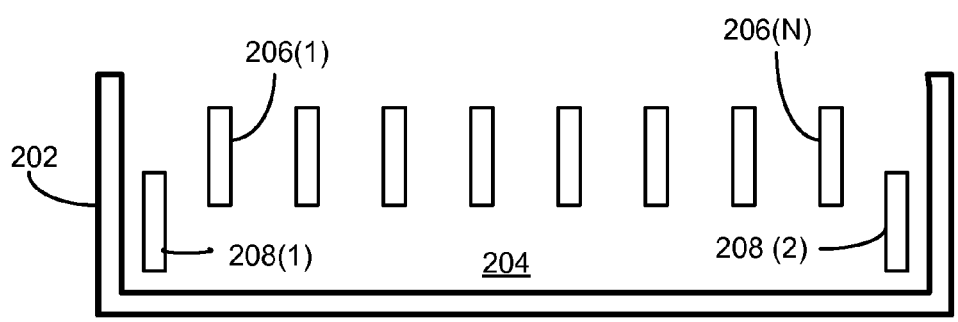
FIG. 2B is a schematic view of the pinout of the receptacle connector shown in FIG. 2A according to an embodiment of the present invention.

FIG. 2B illustrates a simplified schematic view of receptacle connector 200 according to an embodiment of the present invention. As illustrated, in some embodiments, additional contacts $208_{(1)}$ and $208_{(2)}$ are located at either ends of contacts $206_{(1)}$-$206_{(N)}$. Contacts $208_{(1)}$ and $208_{(2)}$ may be used to detect whether the plug connector is fully inserted into cavity 204 or inserted to a point where contacts 112 (or 114) of plug connector 100 (or connector 101) are physically coupled to contacts 206 of receptacle connector 200. In some embodiments, contacts $208_{(1)}$ and $208_{(2)}$ can also be used to detect whether the plug connector has been disconnected from the receptacle connector. In some embodiments, contacts 208 can make contact with cap 120 of plug connector 100 when the plug connector is inserted beyond a certain distance within cavity 204. In some embodiments, contacts 208 are placed such that they will make contact with the ground ring of the plug connector only when contacts 112 make a solid physical connection with contacts 206. In some embodiments, when contacts 208 connect to the ground ring of the plug connector, a signal may be generated indicating the connection.

Figure 2C:
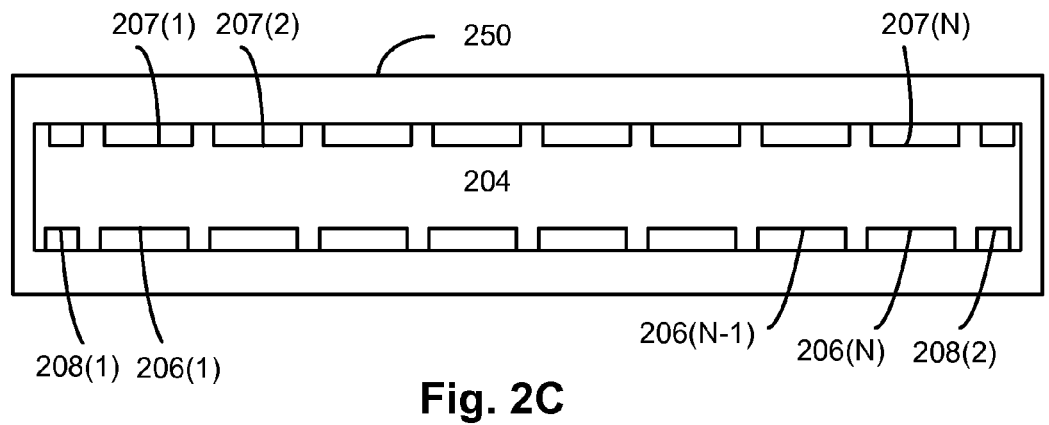
FIG. 2C illustrates a simplified cross-sectional view of a receptacle connector according to another embodiment of the present invention.

In some embodiments, the receptacle connector may have contacts both on the top side and the bottom side of cavity 204. FIG. 2C illustrates a cross-sectional view of a receptacle connector 250 that includes contacts $207_{(1)}$-$207_{(N)}$ on the top and contacts $206_{(1)}$-$206_{(N)}$ on the bottom. In some embodiments, a plug connector with electrically isolated contacts on the top and the bottom side may use the receptacle connector 250 of FIG. 2C.

Figure 2D:
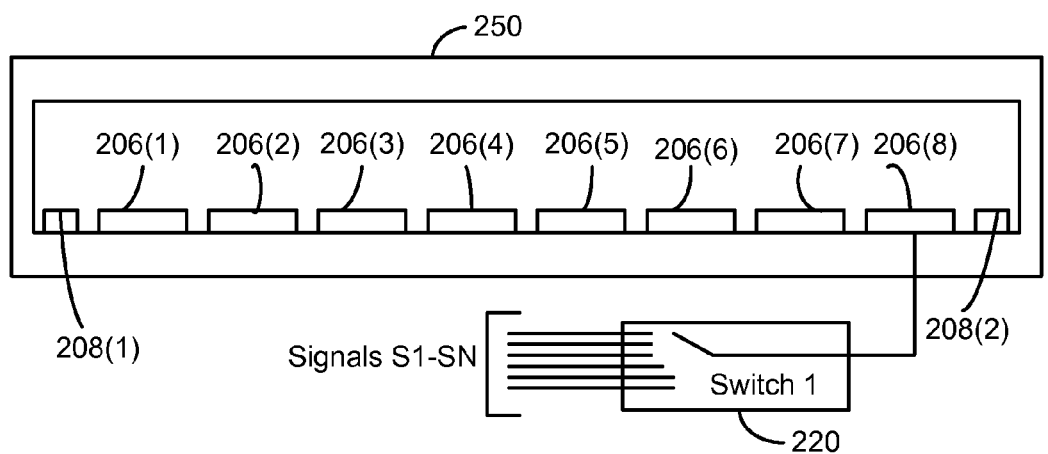
FIG. 2D is a simplified cross-sectional view of a receptacle connector having eight signal contacts and two connection detection contacts according to an embodiment of the present invention.

In some embodiments, receptacle connector 250 may have contacts $206_{(1)-(N)}$ only on a single side inside cavity 204 as described above. In a particular embodiment, receptacle connector 250 may have eight (8) contacts $206_{(1)}$-$206_{(8)}$ as illustrated in FIG. 2D. Some or all of these contacts may be configured to perform one of several functions depending on the signals available on a plug connector. Plug connector 100 (or connector 101) may be associated with any one of several accessories that may be designed to work with a host device that is associated with receptacle connector 250. For example, plug connector 100 (or connector 101) may be associated with an audio only accessory in which case the signals available on the contacts, e.g., $106_{(1)}$-$106_{(N)}$, of the plug connector may include audio and related signals. In other instances, where plug connector 100 (or connector 101) is associated with a more complex accessory such as video accessory, the contacts of plug connector may carry audio, video, and related signals. Thus, in order to enable receptacle connector 250 to be operable with various different types of signals, contacts $206_{(1)-(8)}$ of receptacle connector 250 can be made configurable based on the signals available from a plug connector 100 (or connector 101). In at least one embodiment, one or more contacts of plug connector 100 may be operable to send or receive power from a power source, and one or more contacts of plug connector 100 may be operable to communicate information using various data structures as described herein. Similarly, one or more contacts of receptacle connector 200 may be operable to send or receive power from a power source, and one or more contacts of receptacle connector 200 may be operable to communicate information using various data structures as described herein.

Figure 3:
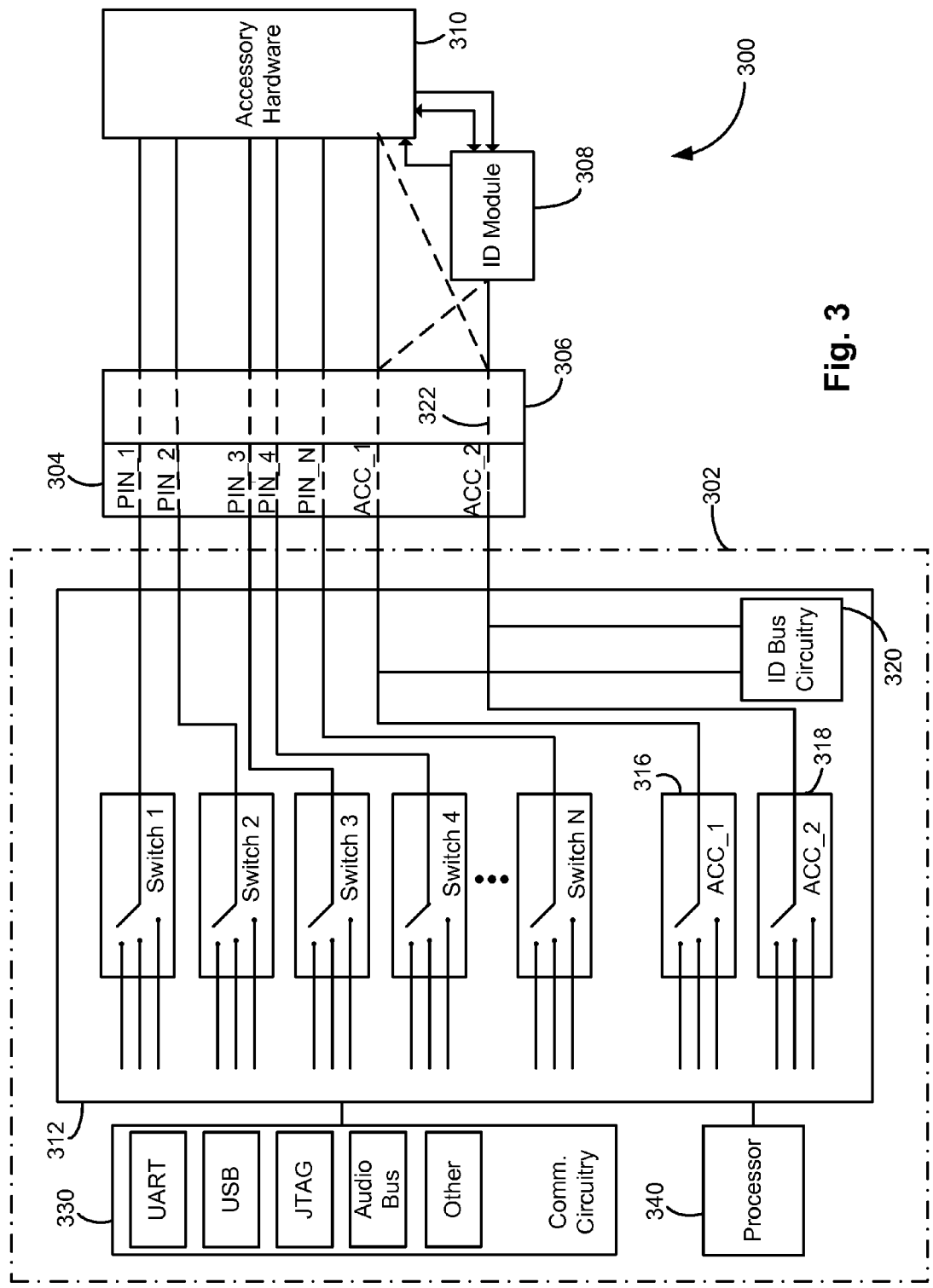
FIG. 3 is a schematic illustrating a system for configuring contacts of a host device according to an embodiment of the present invention.

In the particular embodiment illustrated in FIG. 2D, receptacle connector 250 has eight contacts $206_{(1)-(8)}$ in addition to two connection detection contacts $208_{(1)}$ and $208_{(2)}$. The operation of the connection detection contacts $208_{(1)}$ and $208_{(2)}$ is described above in relation to FIG. 2B. Some or all of contacts $206_{(1)-(8)}$ may have an associated switch that can configure the contact to carry one of many possible signals, e.g., as illustrated in FIG. 3. However, for ease of explanation only one switch 220 coupled to contact $206_{(8)}$ is illustrated in FIG. 2D. It is to be noted that some or all of the other contacts from among contacts $206_{(1)}$-$206_{(8)}$ may each have a similar switch 220 coupled to it. As illustrated in FIG. 2D, switch 220 can be used to configure contact $206_{(8)}$ to carry any one of signals $S_1$-$S_N$ depending on the configuration of the plug connector.

In a particular embodiment, contact $206_{(1)}$ may be an identification bus pins (ACC_1) and can be configured to communicate a command operable to cause an accessory to perform a function and provide a response to a host device unique to the command. The command may be any one or more of a variety of commands, including a request to identify a connector pin and select one of a plurality of communication protocols for communicating over the identified connector pin, a request to set a state of the accessory, and a request to get a state of the accessory. Contact $206_{(1)}$ may also or alternatively be configured to communicate power from the host device to the accessory (e.g., Acc_Pwr). For example, contact $206_{(1)}$ may be coupled to a positive (or negative) voltage source within the host device so as to generate a voltage differential with another pin (such as a ground pin which may be, e.g., contact $206_{(8)}$).

In a particular embodiment, contacts $206_{(2)}$ and $206_{(3)}$ may form a first pair of data pins (DP1/DN1). The data pins may be configured to carry one or more of a variety of signals, such as (a) USB differential data signals, (b) non-USB differential data signal, (c) UART transmit signal, (d) UART receive signal, (e) digital debug input/output signals, (f) a debug clock signal, (g) audio signals, (h) video signals, etc.

In a particular embodiment, contact $206_{(4)}$ may carry incoming power (e.g., a positive voltage relative to another contact such as a ground pin) to the host device (e.g., from a power source in or coupled to the accessory) with which receptacle connector 200 is associated. Contact $206_{(5)}$ may also function as an identification bus pin (ACC_ID) similar to contact $206_{(1)}$ described above. Contact $206_{(5)}$ may also or alternatively be configured to communicate power from the host device to the accessory (e.g., Acc_Pwr), depending on the orientation of a connected plug connector 100 (or connector 101) with respect to receptacle connector 200.

In a particular embodiment, contacts $206_{(6)}$ and $206_{(7)}$ may form a second pair of data pins (DP2/DN2) and can each be configured to carry one or more of a variety of signals, such as (a) USB differential data signals, (b) non-USB differential data signal, (c) UART transmit signal, (d) UART receive signal, (e) digital debug input/output signals, (f) a debug clock signal, (g) audio signals, (h) video signals, etc.

In a particular embodiment, contact $206_{(8)}$ may be a ground pin or otherwise provided at a voltage potential lower than contacts $206_{(1)}$, $206_{(4)}$, and $206_{(5)}$ so as to provide a voltage potential for power being provided to or from the host device.

In some embodiments, tab 104 has a 180 degree symmetrical, double orientation design which enables plug connector 100 (or connector 101) to be inserted into receptacle 200 in both a first orientation and a second orientation. Connector 100 (or connector 101) can be mated with connector 200 where contacts 112 of connector 100 can couple with contacts 206 of connector 200. We can refer to this as the first orientation for purposes of explanation. Details of several particular embodiments of connector 100 (or connector 101) are described in a commonly-owned U.S. patent application Ser. No. 13/607,366, titled "DUAL-ORIENTATION ELECTRONIC CONNECTOR", filed on Sep. 7, 2012, the contents of which are incorporated by reference herein in their entirety for all purposes.

In some embodiments, connector 100 (or connector 101) can be mated with connector 200 in a second orientation. In the second orientation, contacts 114 of connector 100 are coupled with contacts 206 of connector 200. The second orientation may be 180 degrees rotated from the first orientation. However, these are not the only possible orientations. For example, if connector 100 (or connector 101) is a square connector with a corresponding square connector 200, then connector 100 (or connector 101) can be mated with connector 200 in one of four possible orientations. Thus, one skilled in the art will realize that more than two orientations for the connectors may be possible.

FIGS. 2E and 2F illustrate pin-out configuration for a receptacle connector according to two different embodiments of the present invention. In one embodiment, receptacle connector 200 has a pin-out as shown in FIG. 2E that matches the pin-out of connector 100 in FIG. 1E and in another embodiment receptacle connector 200 has a pin-out as shown in FIG. 2F that matches pin-out of connector 101 of FIG. 1F. In each of FIGS. 2E and 2F, the ACC1 and ACC2 pins are configured to mate with either the accessory power (ACC_PWR) or accessory ID (ACC_ID) pins of the plug connector depending on the insertion orientation of plug connector, the pair of Data A contacts is configured to mate with either the pair of Data 1 contacts or the pair of Data 2 contacts of the plug connector, and the P_IN (power in) pin or pins are configured to mate with the Host Power contact or contacts of the plug connector. Additionally, in the pin-out of FIG. 2F, the GND contact is configured to mate with the GND contact in the plug connector.

FIG. 3 is a block diagram of a system 300 according to an embodiment of the present invention. System 300 includes an electronic device 302 (i.e., a host device). Electronic device 302 can be a PC, a PDA, a mobile computing device, a media player, a portable communication device, a laptop computer, or the like. Device 302 may include a microcontroller 312 that, in some embodiments is a hardware-implemented state machine, and a connector 304 that is coupled to microcontroller 312. Device 302 also includes various communication circuitry 330 such as UART, USB, JTAG, audio/video, and/or other communication circuitry. Communication circuitry 330 may be implemented in the same or in different micro-controllers, computer processors, or the like. Device 302 may also include a computer processor 340 that has access to a tangible non-transitory storage medium (not shown) that stores instructions thereon that, when executed by the processor 340, cause the processor to perform various functions. The instructions may be programmed by a user to, e.g., control the behavior of the switches in microcontroller 312. It is to be noted that device 302 may include other components in addition to microcontroller 312. However the additional components are omitted here for the sake of clarity.

Microcontroller 312 can be implemented using one or more integrated circuits and, in some embodiments, is a hardware-implemented state machine. In some embodiments, microcontroller 312 can include ID bus circuitry 320 for detecting orientation of a connector coupled to connector 304. It should be recognized, however, that the ID bus circuitry 320 is optional and may not be provided in electronic device 302 in, e.g., situations where connector 306 is mated with connector 304 in only a single orientation.

Connector 304 can be implemented, e.g., as connector 250 of FIG. 2D. Connector 304 may have multiple contacts $206_{(1)}$-$206_{(N)}$. Some of the contacts of connector 304 may be capable of being assigned one of several functions based on several factors. For example, they may be assigned based on the type of accessory connected to electronic device 302, the orientation in which connector 306 is mated to connector 304, and/or based on some other factor. In any case, contacts of connector 304 can be multiplexed to perform one of several different functions. Each of the contacts in connector 304 is electrically coupled to some communication circuitry disposed in device 302. As illustrated in FIG. 3, several of the contacts of connector 304 are coupled to switches 1-N. In some embodiments, switches 1-N may configure these contacts to perform one of several functions. For example, the functions may include differential data signals, USB power and/or data, UART transmit and/or receive, test ports, debug ports, operational power, video, audio, etc. Each switch may be used to configure one or more associated contacts to carry one of many available signals. In one embodiment, each switch may be coupled to different types of communication circuitry. For example, switch 1 may be coupled to UART, USB, and JTAG circuitry, while switch 2 may be coupled to USB, audio, and other communication circuitry. Each switch may also or alternatively be coupled to power circuitry. For example, switch 1 may be coupled to a power source in electronic device 302. The switches can then switch between the different circuitry such that the pin coupled to the switch is connected to the selected circuitry.

System 300 also includes connector 306, which can be a corresponding connector that mates with connector 304. For example, if connector 304 is a receptacle connector, the connector 306 may be a corresponding plug connector. Connector 306 may be configured to mate with connector 306 in only one orientation or, in some embodiments, in multiple orientations. In some embodiments, connector 306 may be implemented as connector 100 in FIG. 1A. Connector 306 may be associated with an accessory that is designed to be used with device 302. Connector 306 also has several contacts. When connector 306 is physically mated with connector 304, at least one set contacts of connector 306 are in physical contact with the contacts in connector 304. This results in the electrical coupling of the contacts in connector 306 with device 302 via connector 304. As discussed above, in some embodiments, connector 306 may be reversible, such that either the contacts $112_{(1)}$ to $112_{(N)}$ are in electrical connection with contacts $206_{(1)}$-$206_{(N)}$ of connector 304 or contacts $114_{(1)}$ to $114_{(N)}$ are in electrical connection with contacts $206_{(1)}$-$206_{(N)}$ of connector 304. In other embodiments, where connector 306 is not reversible, only contacts $114_{(1)}$ to $114_{(N)}$ may be in electrical connection with contacts $206_{(1)}$-$206_{(N)}$ of connector 304.

For a given accessory, in some embodiments, some or all of the contacts of connector 306 are predefined. By being predefined, contacts of each connector 306 are electrically coupled to various circuitry in the accessory, such as power circuitry, communication circuitry, or other circuitry, provided in identification module 308 and/or accessory hardware 310. For example, one or more contacts of connector 306 may be coupled to power input circuitry and power output circuitry of identification module 308 and/or accessory hardware 310. For another example, one or more contacts of connector 306 may be coupled to USB communication circuitry (i.e., communication circuitry operable to facilitate communication between the accessory and connected devices via a USB protocol) of identification module 308 and/or accessory hardware 310.

Electronic device 302 may not know the function or capability of each of the contacts of connector 306 (i.e., whether the contacts of connector 306 are for providing power, receiving power, communicating over a particular communication protocol such as USB or UART, etc.). As described above, the type of signals carried by connector 306 may depend on the type of accessory that it is associated with. For example, if connector 306 is associated with a charge/sync cable, the contacts of connector 306 may carry at least a power signal and a communication signal, among others. At the time connector 306 is mated with connector 304, the accessory (e.g., ID module 308) may communicate pin configuration information to electronic device 302 identifying one or more pins (e.g., identifying one or more contacts of connector 306) and indicating the functionality or capability of each of the identified pins. In response, electronic device 302 may configure one or more of its contacts in connector 304 so that the operation of the contacts of connector 304 match the operation of the contacts of connector 306, thereby facilitating proper communication and/or power transfer between the electronic device and the accessory.

In other embodiments, some or all of the contacts of connector 306 may not be predefined. By not being predefined, contacts of each connector 306 may be electrically coupled to various circuitry, but the circuitry the contacts are connected to (and/or the function or capability of each contact) may be changed. For example, connector 306 may include a mechanical switch (not shown) that changes the circuitry which one or more contacts of connector 306 is connected to. For another example, connector 306 may include software that may change the function or capability of each contact in response to a hardware or software actuation.

As described above, electronic device 302 may not know the function or capability of each of the contacts of connector 306 either at the initial time of mating the connectors or at a subsequent time when the function or capability of one or more contacts of connector 306 is changed. To inform the electronic device 302 of the capability of the contacts of connector 306, the accessory may communicate the pin configuration information at the initial time of mating (as described above) and/or at a subsequent time in response to a change in the capability of at least one contact of connector 306. For example, after a switch on connector 306 is actuated to change a pin from being operable to communicate using USB to being operable to communicate using UART. After actuating the switch, the accessory may communicate updated pin configuration information to the electronic device 302 where the updated pin configuration information defines the capability of at least the changed pin. The accessory may also or alternatively communicate other information to the host device, such as information indicating the capabilities of the accessory.

In some embodiments, connectors 304 and 306 may be configured such that they can be mated in only one orientation, that is, the connectors are polarized. In such a case, electronic device 302 knows the orientation of connector 306 with respect to connector 304 upon mating. In other embodiments, connectors 304 and 306 may be configured such that they can be mated in two or more orientations but regardless of which orientation the connectors are mated in, the order of contacts presented to the receptacle connector is the same and thus the orientation of connector 306 with respect to connector 304 is unimportant, that is, the mating of the connectors can be said to be orientation agnostic. For example, consider a reversible plug connector that has four contacts 112(1) . . . 112(4) arranged from left to right on one surface and four contacts 114(1) . . . 114(4) directly opposite contacts 112(1) . . . 112(4) on the opposing surface. When contact 112(1) and contact 114(4) are shorted together to carry a ground signal, contact 112(2) and contact 114(3) are shorted together to carry a first data signal, contact 112(3) and contact 114(2) are shorted together to carry a second data signal, and contact 112(4) and contact 114(1) are shorted together to carry a power signal, regardless of whether the plug connector is inserted into its receptacle connector in an up or down orientation, the order of signals presented at the receptacle contacts from left to right will be ground, data 1, data 2, power.

In still other embodiments, however, connectors 304 and 306 may be configured such that they can be mated in two or more orientations and where the order of signals presented at the receptacle connector contacts may vary depending on the mated orientation. In such embodiments, electronic device 302 may initially detect the orientation of connector 306 with respect to connector 304, and then use that information to configure some or all of the contacts of connector 304 based solely or at least in part on the detected orientation. As an example of one particular embodiment of the invention where the order of signals presented at the receptacle connector differs based on the orientation in which connector 306 is mated with connector 304, consider a reversible plug connector 306 for a particular accessory that has eight signal contacts 112(1) . . . 112(8) where contact 112(1) carries and accessory power signal and is shorted to contact 114(4); contacts 112(2) and 112(3) carry a first pair of data signals for a first data channel and are shorted to contacts 114(2) and 114(3), respectively; contact 112(4) carries a power (charge) signal and is shorted to contact 114(5); contact 112(5) carries an accessory ID signal and is shorted to contact 114(8); contacts 112(6) and 112(7) carry a second pair of data signals for a second data channel and are shorted to contacts 114(6) and 114(7), respectively; and contact 112(8) carries ground and is shorted to contact 114(1). The corresponding receptacle connector 306 for this embodiment may correspond to receptacle connector 250 and have eight signal contacts 206(1) . . . 206(8) as follows: contact 206(1) is dedicated to ground; contact 206(5) is dedicated to power (charge) signal; contacts 206(2) and 206(3) correspond to the PIN_1 and PIN_2 and can carry the first data channel signal; and contacts 206(6) and 206(7) correspond to PIN_3 and PIN_4 and can carry the second data channel signal. Contact 206(4) and 206(8) correspond to the ACC_1 and ACC_2 contacts and, depending on the orientation of the mated connectors, contact 206(4) will carry either the accessory ID signal or the accessory power (i.e., power out) signal while contact 206(8) will carry the other of the accessory ID or accessory power signals. The process of detecting the orientation of connector 306 is referred to as orientation detection and is discussed more fully below.

Orientation Detection

As described above, in some embodiments, the accessory-side connector can be mated with the host-side connector in more than one orientation. In such an instance, it may be desirable to determine the orientation of the accessory-side connector with respect to the host-side connector in order to properly route signals between the host device and the accessory.

In some embodiments, one or more of the contacts in connector 304 may be used for determining orientation. All switches inside microcontroller 312 that control the respective contacts of connector 304 may initially be in an "open" state. In the embodiment of FIG. 3, two contacts, illustrated as ACC_1 and ACC_2, can be used to determine orientation. For example, contacts ACC_1 and ACC_2 can be chosen from among contacts $206_{(1)}$-$206_{(N)}$ and/or contacts $207_{(1)}$-$207_{(N)}$ of connector 250 of FIG. 2C. Similarly, pins PIN_1 through PIN_N can be chosen from among contacts $206_{(1)}$-$206_{(N)}$ and/or contacts $207_{(1)}$-$207_{(N)}$. For purposes of illustration, consider that contacts ACC_1 and ACC_2 respectively correspond to pins $206_{(4)}$ and $206_{(8)}$, similar to the embodiment described with reference to FIG. 2F. Each of these contacts ACC_1 and ACC_2 are connected to corresponding switches 316 and 318, respectively. Similar to the contacts $206_{(1)}$-$206_{(8)}$ depicted in FIG. 2D, contacts ACC_1 and ACC_2 can also be configured to perform one of several functions. In some embodiments, contacts ACC_1 and ACC_2 are first used to detect orientation and then later may be configured to perform certain other functions once the orientation detection is complete. For example, ACC_1 may subsequently be used to provide power to accessory hardware 310, while ACC_2 may be used to communicate with ID module 308. This may be facilitated by connecting different types of circuitry, e.g., power circuitry, communication circuitry, etc., to each of switches 316 and 318, where switches 316 and 318 can selectively couple the circuitry to the respective ACC_1 or ACC_2 contacts. In some embodiments, contacts PIN_1 through PIN_N and/or ACC_1 and ACC_2 may be floating prior to the completion of the orientation detection process. "Floating" in this context means that the contacts PIN_1 through PIN_N and/or ACC_1 and ACC_2 may not be assigned any function prior to the orientation detection and are in a deactivated state. This may be accomplished by having switches 1-N and/or switches 316 and 318 in an "open" state.

In some embodiments, ID bus circuitry 320 is coupled to contacts ACC_1 and ACC_2 and can monitor contacts ACC_1 and ACC_2 to detect the presence or absence of a particular or expected signal on either of the contacts. ID bus circuitry 320 can send a command sequence over any of the contacts ACC_1 and ACC_2 and detect a response sequence to the command sequence. This will be explained in detail below.

In some embodiments, system 300 may include an ID module 308. ID module 308 may be implemented as an Application Specific Integrated Circuit (ASIC) chip programmed to perform a specific function. In some embodiments, ID module 308 may be disposed in the accessory that connects with host device 302 and that includes accessory hardware 310. In some embodiments, ID module 308 may receive a command from device 302 via contact ACC_2 and respond with a predetermined response to the command. In some embodiments, ID module 308 is closely integrated with connector 306. In other words, ID module 308 and connector 306 may be disposed in an accessory that is configured to be operable with device 302. Thus, in an instance where the accessory is a cable, connector 306 and ID module 308 can be part of the cable. In some embodiments, ID module 308 may be an integral part of connector 306 and may be disposed within the housing of connector 306. In some embodiments, ID module 308 may include configuration information associated with the contacts of connector 306 with which it is associated. Upon successful connection with device 302, ID module 308 may provide the configuration information to device 302 as described below. ID module 308 may also or alternatively include accessory state information indicating a state of the accessory, accessory capability information indicating one or more capabilities of the accessory, which may be provided to the host device on request.

In some embodiments, system 300 may also include accessory hardware 310. Accessory hardware 310 can be a processor (or processors) and other associated circuitry of an accessory that is designed to be operable with device 302. In some embodiments an accessory may provide power to device 302, while in other embodiments the accessory may be powered by device 302. Power may be transferred between the electronic device and the accessory between, e.g., one or more of PIN_1 through PIN_N, ACC_1, and ACC_2. In at least one embodiment, power is transferred to electronic device 302 from a power source through accessory hardware 310. Accessory hardware 310 may include impedance altering circuitry such that an impedance of the accessory may be altered. For example, the impedance of the accessory hardware 310 arranged between a power source and the electronic device 302 may be increased or decreased. In at least one embodiment, the impedance of the accessory hardware 310 may be controlled by a command sent to the accessory from the electronic device 302 so that the current provided from the power source to the electronic device 302 via the accessory hardware 310 may be selectively limited. Various detailed embodiments of controlling the impedance of an accessory are further described in co-owned U.S. patent application Ser. No. 13/607,478, titled "METHODS, SYSTEMS AND APPARATUS FOR ENABLING AN ACCESSORY FOR USE WITH A HOST DEVICE", filed on Sep. 07, 2012, and co-owned U.S. patent application Ser. No. 13/730,667, titled "METHODS, SYSTEMS AND APPARATUS FOR DETERMINING WHETHER AN ACCESSORY INCLUDES PARTICULAR CIRCUITRY", filed on Dec. 28, 2012, the contents of both of which are incorporated by reference herein in their entirety for all purposes.

It should be recognized that ID module 308 and ACC_1 and ACC_2 pins are optional. For example, such circuitry and pins may be excluded in cases where the connectors 304 and 306 are mated in only a single orientation. In such cases, the configuration information, state information, and/or capability information described above may be stored in accessory hardware 310 (or a separate data store) and provided to electronic device 302 via one of PIN_1 through PIN_N.

Further, it will be appreciated that the system configurations and components described herein are illustrative and that variations and modifications are possible. The device and/or accessory may have other components not specifically described herein. Further, while the device and the accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

In operation, in an embodiment of the present invention, connectors 304 and 306 may be mated in only a single orientation or in an orientation agnostic manner as described above. In such a case, when connector 304 is physically mated with connector 306, accessory hardware 310 communicates pin configuration information to the electronic device 302 via one or more pins including PIN_1 through PIN_N, ACC_1 and ACC_2. In some embodiments, accessory hardware 310 may communicate other information as well, such as accessory capability information defining one or more capabilities of the accessory, accessory state information defining one or more states of the accessory, etc.

In some cases, the various information may be communicated to electronic device 302 as part of a response sequence. For example, when connector 304 is physically mated with connector 306, electronic device 302 may initially send a command sequence to the accessory. The command sequence may be stored in ID bus circuitry 320 and sent via one of ACC_1 and ACC_2 pins, or, may be stored in other circuitry of electronic device 302 and sent via one of PIN_1 through PIN_N. Upon receiving (and, in some embodiments, authenticating) the command sequence, the accessory may provide a response sequence including the configuration information and/or other information. The response sequence may be provided by the ID module 308 or accessory hardware 310. Various command and response sequences are further described below.

In other embodiments, connectors 304 and 306 may be mated in multiple orientations where the order of signals presented at the receptacle connector contacts varies depending on the mated orientation. In such a case, microcontroller 312 may initiate the orientation detection operation. For example, connector 306 may be configured such that one contact within connector 306 carries an identification signal, e.g., ID contact 322. Once that contact is identified, device 302 can determine an orientation of connector 306

As also described above, in order to illustrate the orientation detection process, we considered that either contact ACC_1 or ACC_2 (FIG. 3), is connected with ID contact 322. Thus, in one orientation, ID contact 322 can be connected to ACC_1 and in a second orientation, which is 180 degrees from the first orientation, ID contact 322 can be connected to ACC_2. In order to determine which of contacts ACC_1 or ACC_2 is connected to ID contact 322, the following process may be used.

Once it is determined that connector 306 is mated with connector 304, ID bus circuitry 320 may communicate a command over one of ACC_1 and ACC_2 pins while maintaining the other of the ACC_1 and ACC_2 pins in a high impedance state. By way of the mating between connector 304 and 306, the ACC_1 and ACC_2 pins will be electrically coupled to accessory hardware 310 or ID module 308. In this instance and for purposes of illustration, it is assumed that upon mating connector 304 and 306, the ACC_1 pin is electrically coupled to accessory hardware 310 and the ACC_2 pin is electrically coupled to ID module 308.

Upon mating connectors 304 and 306, ID bus circuitry 320 sends a command over the ACC_1 contact, e.g., using ID bus circuitry 320. ID bus circuitry 320 then "listens" for a specific, expected response to the command on the ACC_1 contact. In some embodiments, the command is interpretable only by ID module 308, which in turn generates a response to the command. However, in this example, the ACC_1 contact is coupled to accessory hardware 310 and not to ID module 308. Therefore, ID module 308 does not receive the command nor does it generate a response. Consequently, no response is received by ID bus circuitry 320 via the ACC_1 contact.

If after a predetermined time ID bus circuitry 320 does not detect a response on the ACC_1 contact, ID bus circuitry 320 places ACC_1 contact into a high impedance state and re-sends the command via the ACC_2 contact. Because the ACC_2 contact is connected to ID module 308, once ID module 308 receives the command, it generates and sends a response over the ACC_2 contact to microcontroller 312. The response is detected by ID bus circuitry 320. Thus, microcontroller 312 now knows that the ACC_2 contact is connected to ID module 308 and designates the line that is coupled to the ACC_2 contact as the accessory communication line. In some embodiments, microcontroller 312 may also designate the line that is coupled to the ACC_1 contact (i.e., the line electrically coupled to accessory hardware 310) as a power line that provides operating power to the accessory from electronic device 302. Based on the information about the accessory communication contact and the accessory power contact, electronic device 302 can now recognize the orientation of the connector 306 with respect to connector 304 and configure its pins accordingly.

Request and Response Data Structure

Certain embodiments of the present invention provide data structures for facilitating communication between a host device and an accessory. For example, in some embodiments the host device may send a request to the accessory to send accessory identification information. The accessory may provide a response that includes information about the contact configuration for the accessory-side connector in addition to capability information defining one or more capabilities of the accessory.

Figure 4A:
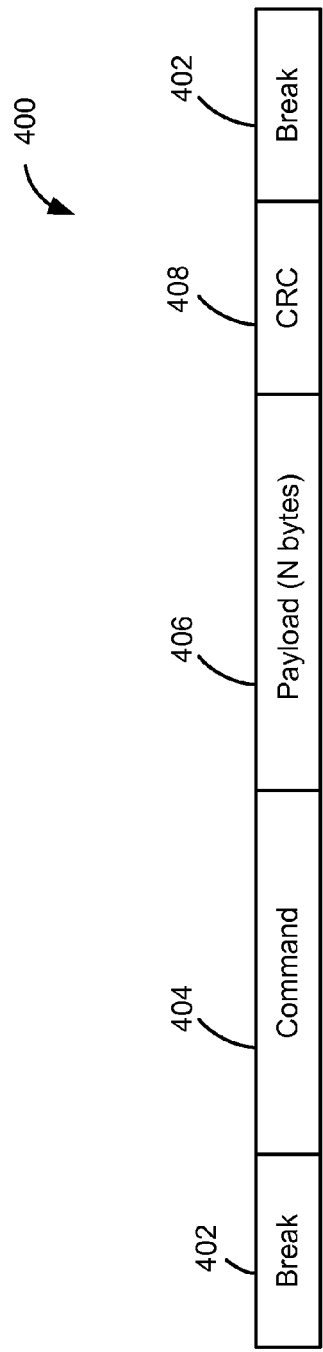
FIG. 4A illustrates a command sequence according to an embodiment of the present invention.

FIG. 4A illustrates a structure for a request command sequence 400 that can be sent by the microcontroller over the ACC_1 or the ACC_2 lines according to an embodiment of the present invention. Command sequence 400 may include a break pulse 402. In some embodiments, break pulse 402 is used to indicate to the ID module that a request is being sent by the microcontroller. In some embodiments, the duration of the break pulse is programmable. In some embodiments, break pulse 402 resets the ID module to a known state so that the ID module is ready to receive the command from the microcontroller. Break pulse 402 is followed by a command 404. In some embodiments, command 404 can be between 8 and 16 bits, and may be a unique sequence of those bits. Command 404 may be operable to cause the accessory to perform a function and provide a response to the host device that is unique to the command. For example, the command may be a request for the accessory to identify a pin (e.g., ID contact 322) and select one of a plurality of communication protocols for communicating over the identified connector pin (e.g., select the state of switch ACC_2 318). For another example, the command may be a request for information indicating the capabilities of the accessory. For yet another example, the command may be a request to set or get the state of the accessory. Various command data structures and their response data structures are described with reference to FIGS. 5A to 7B.

In some embodiments, command 404 can be followed by an N-byte payload 406. In other embodiments, command 404 can be sent without any payload (i.e., N is zero). Payload 406 may include, e.g., a unique system identifier associated with the microcontroller. The system identifier can be used by the ID module to recognize the microcontroller and/or the device and formulate a response to command 404. For example, the system identifier may inform the ID module whether the host device is phone, a media player, or a personal computing device, e.g., a tablet computer, or a debug device.

In some embodiments, payload 406 (or command 404) may be followed by Cyclic Redundancy Check (CRC) sequence 408 generated for one or more of the command 404 and the payload 406. CRC is an error-detecting code designed to detect accidental changes to raw computer data, and is commonly used in digital networks and storage devices. Blocks of data entering these systems get a short check value attached, derived from the remainder of a polynomial division of their contents; on retrieval the calculation is repeated, and corrective action can be taken against presumed data corruption if the check values do not match. In some embodiments, CRC sequence 408 can be generated using an 8 polynomial function of $X^8+X^7+X^4+1$. In some embodiments, CRC 408 may be followed by another break pulse 402 signaling the end of the command sequence. This indicates to the ID module that the microcontroller has finished sending the command and associated data, if any, and is now ready to receive a response. This second break pulse may have the same or different structure (e.g., duration) as the first break pulse. It is to be understood that only the ID module can interpret and respond to this command. Thus, if command sequence 400 is sent over a line that is not connected to the ID module, the microcontroller will not receive a response to the command. In some embodiments, the command will time out. In this instance, the microcontroller will conclude that the line is not connected to the ID module and hence is not the ID bus line.

One skilled in the art will realize the command sequence 400 is illustrative only and may include more or less information than shown in FIG. 4A depending on the specific requirements for communication between the device and the accessory that includes the ID module.

Figure 4B:
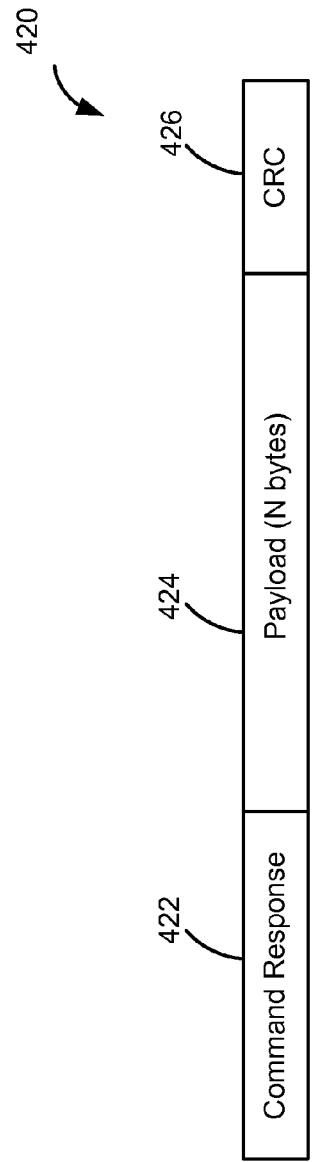
FIG. 4B illustrates a response sequence for the command according to an embodiment of the present invention.

Once the ID module receives command sequence 400, it may send a response sequence 420 as illustrated in FIG. 4B.

Response sequence 420 may include a command response 422. Command response 422 may be a predetermined response for command 404. For example, regardless of the type of device connected, each ID module may generate the same command response 422 in response to receiving command 404 from the device. Command response 422, like command sequence 400, may be 8 to 16 bits long, and may be a unique sequence of bits provided in response to each different type of command. Response sequence 420 may also include an N-byte payload 424, which may be from 0 to 48-bits long. Payload 424 may include a variety of information. For example, in one embodiment payload 424 includes a pin selection field operable to identify a connector pin and cause a host device to select one of a plurality of communication protocols for communicating with an accessory over the identified connector pin.

In some embodiments, payload 424 may be followed by CRC 426. CRC 426 may be similar to CRC 408, but in this case generated for one or more of command response 422 and payload 424. In some embodiments, the total duration for sending command sequence 400 and receiving response sequence 420 is about 2 milliseconds, 3 milliseconds, 4 milliseconds, in a range from 3 milliseconds to 5 milliseconds, less than 3 milliseconds or greater than 5 milliseconds.

Figure 5A:
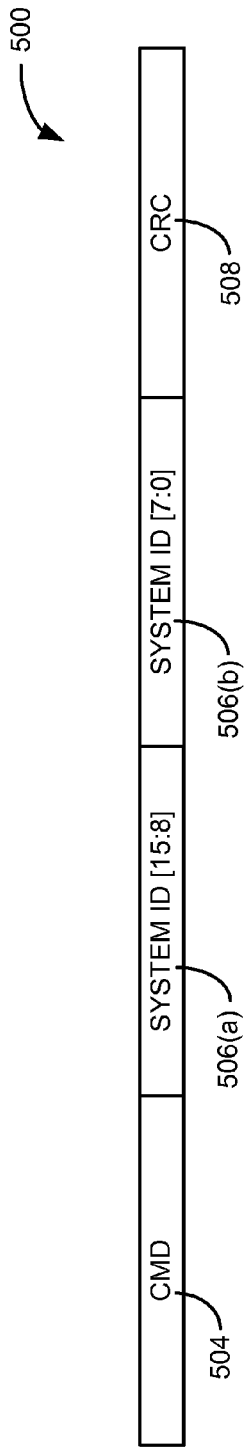
FIG. 5A illustrates a detailed structure for a portion of a command sequence for requesting pin configuration and accessory capability information according to an embodiment of the present invention.

FIG. 5A illustrates a detailed structure for a portion of command sequence 500 for requesting pin configuration and accessory capability information according to one embodiment. Command 504 corresponds to command 404, system identifier portions 506(a) and 506(b) correspond to payload 406, and CRC 508 corresponds to CRC 408. The command 504 is a single byte field followed by two bytes forming the payload 506 and a single byte CRC 508. The command 504 in this embodiment is a request for pin configuration and accessory capability information. The payload 506 in this case is formed from a first portion 506(a) that includes a first portion of a system identifier followed by a second portion 506(b) that includes a second portion of the system identifier. In some embodiments, each portion constitutes one byte of the system identifier. The system identifier is a unique identifier for each type of product (e.g., phone, tablet, etc.) that is fused in the hardware of that product. The payload 506 is then followed by a single byte field forming the CRC 508.

Figure 5B:
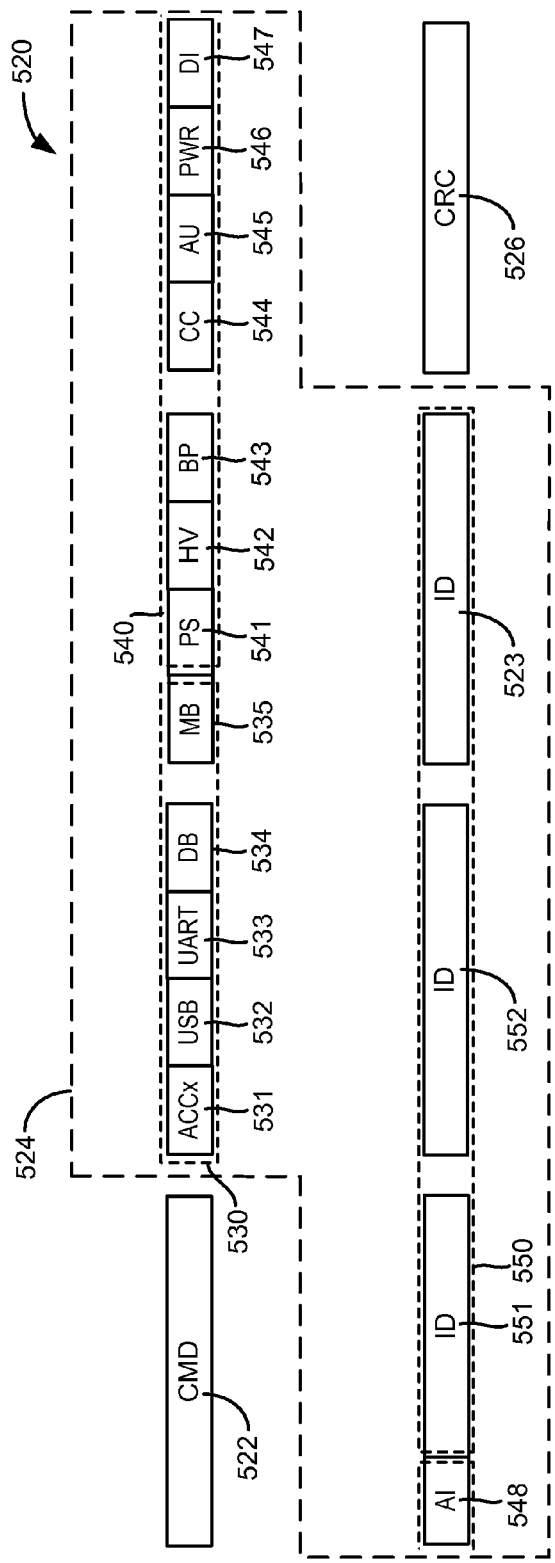
FIG. 5B illustrates a detailed structure of a response sequence for responding to a request for pin configuration and accessory capability information according to an embodiment of the present invention.

FIG. 5B illustrates a detailed structure of a response sequence 520 for responding to a request for pin configuration and accessory capability information. Command response 522 corresponds to command response 422, payload 524 corresponds to payload 406, and CRC 526 corresponds to CRC 426. The command response 522 is a single byte field followed by a six byte payload 524 and single byte CRC 526. The command response 522 in this case is a unique sequence of bits that corresponds to the unique command 504. The CRC 526 is a CRC of the command response 522 and payload 524. The payload in this case includes a pin selection field 530 followed by an accessory capability field 540 followed by an expansion field 550. The pin selection field 530 is operable to cause a host device to select one of a plurality of communication protocols (e.g., UART, USB, JTAG, etc.) for communicating with the accessory over one or more connector pins (e.g., one or more of the pins in connector 304), or performing some other type of function/operation (e.g., supplying power, receiving power, etc.) via one or more connector pins. The accessory capability field 540 defines or more capabilities of the accessory, such as the maximum speed of the selected communication protocol that the accessory can communicate at. The expansion field 550 may include any other information suitable to be communicated from the accessory to the host, such as information defining additional capabilities of the accessory.

In some embodiments, pin selection field 530 may include one or more individual or sets of bits that operate to identify a connector pin and cause the host device to select a communication protocol, power source, or other functional capability. Accordingly, pin selection field 530 may include ACCx bits 531 that operate to define the function of contacts ACC_1 and ACC_2. By defining the function of contacts ACC_1 and ACC_2, microcontroller 312 may use the contents of the ACCx bits 531 to configure corresponding contacts in the host-side connector.

For example, the contents of the ACCx bits 531 may cause microcontroller 312 to switch ACC_1 316 to a power source provided in electronic device 302 so as to provide power to pin ACC_1, and may cause microcontroller 312 to switch ACC_2 318 to UART communication circuitry provided within electronic device 302 so that electronic device 302 may communicate with ID module 308 via UART on pin ACC_2. For another example, the contents of the ACCx bits 531 may cause microcontroller 312 to couple the ACC_1 pin to the ID bus circuitry 320 while leaving the ACC_2 pin in a high impedance state. The ACC_2 pin may then subsequently be controlled by software whereby the software may control switch 318 to couple the ACC_2 pin to a power source in the host device. For yet another example, the contents of the ACCx bits 531 may cause microcontroller 312 to couple the ACC_1 pin to a transmission circuitry (e.g., USB_Tx, UART_Tx, etc.) while coupling the ACC_2 pin to reception circuitry (e.g., USB_Rx, UART_Rx, etc.). More generally, the contents of the ACCx bits 531 may cause microcontroller 312 to couple the ACC_1 and ACC_2 pins to co-operating circuitry, such as by coupling ACC_1 to JTAG digital I/O circuitry and ACC_2 to JTAG Clock circuitry. For yet another example, the contents of the ACCx bits 531 may cause microcontroller 312 to reset the host device.

Returning to FIG. 5B, in addition or alternatively to ACCx bits 531 defining the function of contacts ACC_1 and ACC_2, pin selection field 530 may include USB bits 532, UART bits 533, DB bits 534, and MB bits 535. USB bits 532 indicate the USB configuration of the accessory and thus the desired USB configuration of the host device. For example, the USB configuration may indicate whether the host device should act as host or slave, and/or whether the accessory has or does not have USB capability. UART bits 533 indicate a configuration of the UART controller in the accessory, which includes a speed of the UART controller. For example, the UART bits 535 may indicate that the accessory does not include UART control, that the accessory is capable of communicating over UART at 17200 bps, that the accessory is capable of communicating over UART at 57600 bps, or that the accessory is capable of communicating over UART at 115200 bps. DB bits 534 indicate whether the accessory is a debug accessory (i.e., an accessory used for debugging the host device) or a non-debug accessory (e.g., a customer accessory). MB bits 535 indicate whether the accessory includes an audio and/or video data transfer bus.

The USB, UART, DB, and MB bits may be used by the host device to configure one or more of its switches, such as Switch 1 through Switch N and/or switches 316 and 318. For example, when the USB bits 533 indicate that the accessory is capable of USB communication, the MB bits 534 indicates the accessory does not include an audio or video data transfer bus, and the UART bits indicate that the accessory is capable of UART communication at certain data transfer rate, PIN_1 and PIN_2 may be configured for USB communication while PIN_3 and PIN_4 may be configured for UART communication.

Like the pin selection field 530, the accessory capability field 540 may include one or more individual or sets of bits. These bits, however, operate to indicate capabilities of the accessory and, in most embodiments, are not used by the host device to control its switches such as Switch 1 to N or switches 316 and 318.

Accessory capability field 540 may include one or more of a variety of accessory capability bits, such as PS bits 541, HV bits 542, BP bits 543, CC bits 544, AU bits 545, PWR bits 546, DI bits 547, and AI bits 548.

PS bits 541 indicate when power should be supplied from the host device to the accessory (e.g., over ACC_1 or ACC_2). For example, the PS bits 541 in one state may indicate that power charging should be disabled when the host device is asleep, whereas a the PS bits 542 in another state may indicate that power charging should be enabled at all times the accessory is connected to the host device.

HV bits 542 indicate the maximum charging voltage supported by the accessory, where the maximum charging voltage is the maximum voltage that the accessory may safely transfer from a power source to the host device. For example, HV bits 542 may indicate a maximum charge voltage of 0 volts, 5 volts, 10 volts, 15 volts, 20 volts, a voltage in the range of 0 to 20 volts, or a voltage greater than 20 volts.

BP bits 543 indicate the charging behavior of the host device when receiving power from the accessory. For example, BP bits 543 in one state may indicate that the host device may receive and consume power from the accessory for both operating the host device and charging a battery of the host device, whereas BP bits 543 in another state may indicate that the host device may use received power only for operating the host device.

CC bits 544 indicate the power removal behavior which is the behavior of the host device when power is removed from the host device. For example, the CC bits 544 in one state may indicate that the host device may continue normal operation when power is removed, whereas the CC bits 544 in another state may indicate that the host device should pause operation when power is removed.

AU bits 545 indicate whether the accessory supports authentication commands from a host device, where authentication commands may be commands used to authenticate the accessory.

PWR bits 546 indicate the maximum power that the accessory can receive from the host device via, e.g., ACC_1 or ACC_2 bits. For example, PWR bits 541 may indicate a maximum accessory voltage of 0 volts, 1 volt, 2 volts, 3 volts, 4 volts, 5 volts, a voltage in the range of 0 to 5 volts, or a voltage greater than 5 volts.

DI bits 547 indicate the diagnostics mode behavior which is the behavior of the host device with respect to diagnostic operation. For example, DI bits 547 in one state may indicate that the host device may continue normal operation, whereas DI bits 547 in another state may indicate that the host device should enter factory diagnostics operation.

AI bits 548 indicate whether an accessory supports accessory information commands from a host device, where an accessory information command is a command requesting accessory information such as the accessory manufacturer, accessory model number, accessory name, or other accessory-related information. In some embodiments, payload 524 further includes an identifier associated with the accessory incorporating the ID module, e.g., a serial number of the accessory.

In some embodiments, such as when the microcontroller 312 is a hardware-implemented state machine, pins of the host device (e.g., pin ACC_1 and ACC_2) may be configured even if the host device does not have any power. Once the host device acquires sufficient power to execute software on its processor, e.g., processor 340, the programmed software may then reconfigure the switches. For example, processor 340 may control microcontroller 312 so as to reconfigure switches 1-N and/or switches 316 and 318, thereby reconfiguring the pins of the host device. In one particular example, the ACCx bits 531 may be configured to instruct the microcontroller 312 to couple the ACC_1 pin to the ID bus circuitry 320 while leaving the ACC_2 pin in a high impedance state. The ACC_2 pin may then subsequently be controlled by software, e.g., in accordance with table 600, whereby the software may control switch 318 to couple the ACC_2 pin to a power source in the host device. It should be recognized that not only may ACC_1 and ACC_2 be initially configured in hardware and subsequently configured software, but other pins such as PIN_1 through PIN_4 may similarly be configured.

In some embodiments, the pin configuration may change for a given payload 524 based on the results of the orientation detection process which, in some embodiments, may also be performed by a hardware-implemented state machine. That is, as a result of the orientation detection process previously described, ID Bus Circuitry 320 may detect a signal on one of contacts ACC_1 and ACC_2. When ID Bus Circuitry 320 detects a signal on contact ACC_1 (e.g., by sending a command and receiving an expected response over ACC_1), microcontroller 312 may configure its switches for a given payload 524 such that the pins in connector 304 are operable to perform a set of functions. However, when ID Bus circuitry 320 detects a signal on contact ACC_2, microcontroller 312 may configure its switches for the same payload 524 differently such that the pins in connector 304 are operable to perform a different set of functions, or the same set of functions but dispersed across different pins. For example, for a particular ACCx value, in one orientation ACC_1 may be set for software control and ACC_2 may be set for connection to ID Bus Circuitry 320, while in another orientation ACC_1 may be set for connection to ID Bus Circuitry 320 and ACC_2 set for software control. For another example, for a particular value of pin selection 530, in one orientation PIN_1 and PIN_2 may be set for software control and PIN_3 and PIN_4 set for USB communication, while in another orientation PIN_1 and PIN_2 may set for USB communications while PIN_3 and PIN_4 are set for software control.

One skilled in the art would recognize that the specific bit assignments depicted in and described with reference to FIG. 5B are merely exemplary and not limiting. While the pin selection field 530 is shown to include five component fields (ACCx, USB, UART, DB, MB), it may include more or fewer component fields. Similarly, while the accessory capability field 540 is shown to include eight component fields, it may include more or fewer component fields. Further, each component field may include one or more bits. The order of each field (e.g., pin selection field 530 followed by accessory capability field 540) is also not to be limited to the order depicted in FIG. 5B, but rather the fields could be arranged in different orders (e.g., the accessory capability field 540 could be followed by the pin selection field 530). Similarly, the order of the components in each field (e.g., ACCx component 531 followed by USB component 532) is also not to be limited to the order depicted in FIG. 5B, but rather the components could be arranged in different orders (e.g., USB component 532 could be followed by ACCX component 531). The number of components of each field is also not limited to the number of components depicted in FIG. 5B, but rather each field (e.g., pin selection field 530) could include more or fewer components (e.g., UART component 533 and DB component 534 could be omitted).

Figure 6A:
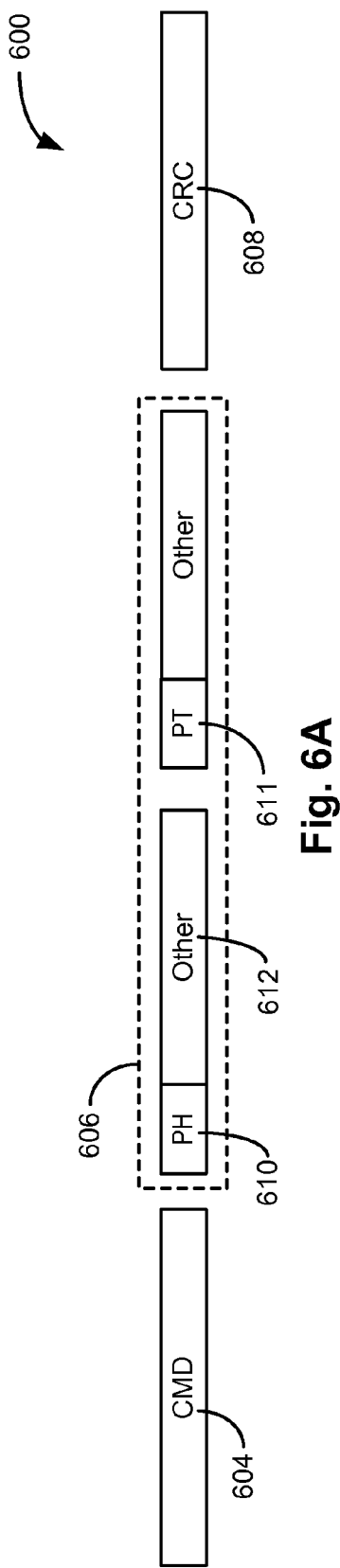
FIG. 6A illustrates a detailed structure for a portion of a command sequence for setting a state of an accessory according to an embodiment of the present invention.

FIG. 6A illustrates a detailed structure for a portion of a command sequence 600 for setting a state of an accessory. Command 604 corresponds to command 404, state setting field 606 corresponds to payload 406, and CRC 608 corresponds to CRC 408. The command 604 is a single byte field followed by two bytes forming the state setting field 606 and a single byte CRC 608. The command 604 in this embodiment is a request for the accessory to set one or more operational states in accordance with desired states indicated in the state setting field 606. The state setting field 606 in this case is a two-byte field that indicates a desired state for one or more operations of the accessory. The state setting field 606 is then followed by a single byte field forming the CRC 608.

In accordance with the embodiment depicted in FIG. 6A, the state setting field 606 is configured to control two operational states of the accessory: charge current and command passthrough. Specifically, the state setting field 606 includes PH bit 610 which controls the amount of charge current the accessory provides the host device. For example, accessory hardware 310 may provide power from a power source to electronic device 302 and, as previously described, may include impedance altering circuitry. The PH bit 610 may indicate to the accessory a desired state of the impedance altering circuitry. For example, for a particular PH bit 610 value, the accessory may enable its impedance altering circuitry so as to limit the amount of current provided to the electronic device. In some embodiments, the impedance altering circuitry may limit the amount of current to a nominal amount, such as 0 A, or may limit the amount of current to other amounts greater than 0 A. For another particular PH bit 610 value, the accessory may disable its impedance altering circuitry so that the amount of current provided to the electronic device from the power source is not limited.

The state setting field 606 also includes PT bit 611 which controls which internal circuitry of the accessory receives commands communicated from the host device. For example, the ID module 308 operates to receive commands over an ID contact 322 and may comprise one physical chip. The PT bit 611 may indicate to the accessory whether the commands communicated to the ID module 308 should be communicated from the ID module to other physical chips of the accessory. For example, the PT bit 611 may indicate whether the commands should pass through the ID module 308 to the accessory hardware 310. For example, for a particular PT bit 611 value, passthrough may be disabled such that the accessory does not forward subsequently received commands to other components of the accessory. For another particular PT bit 611 value, passthrough may be enabled such that the accessory does forward subsequently received commands (in some cases including related information such as a corresponding payload, CRC, etc.) to other components of the accessory (e.g., accessory hardware 310).

The state setting field 606 also includes other bits 612, which may be used to control one or more other operations of the accessory. The other bits 612 are depicted as following each of the PH and PT bits, but in other embodiments one or more of the other bits 612 could be arranged elsewhere within the state setting field 606. For example, one or more of other bits 612 could be arranged between PH bit and PT bit, behind PH bit and/or PT bit, and/or in front of PH bit and/or PT bit.

It should be recognized that embodiments are not limited to PH bit 818 and PT bit 611 being one bit in size or arranged in the order depicted in FIG. 6A, but rather they could be greater than one bit in size, arranged in different orders (e.g., the PT bit 611 prior to rather than following the PH bit), or arranged at different locations within the state setting field 606 (e.g., at the highest significant bits of a byte, the lowest significant bits of a byte, or somewhere in between the lowest significant bits and highest significant bits). Moreover, one or more bits in state setting field 606 may be operable to control more, fewer, or different states of the accessory than those described with reference to FIG. 6A.

Figure 6B:
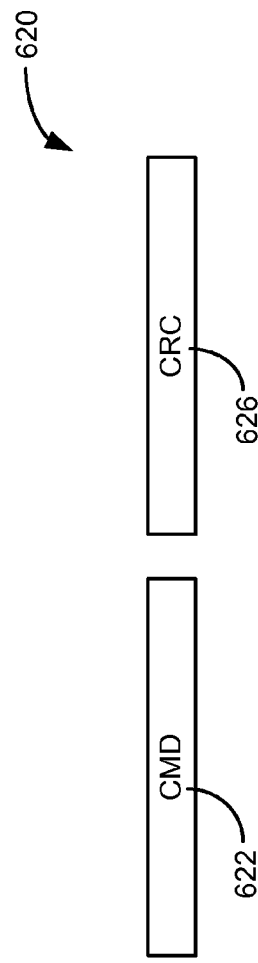
FIG. 6B illustrates a detailed structure of a response sequence for responding to a command for setting a state of an accessory according to an embodiment of the present invention.

FIG. 6B illustrates a detailed structure of a response sequence 620 for responding to a command for setting a state of an accessory. Command response 622 corresponds to command response 422, and CRC 626 corresponds to CRC 426. The command response 622 is a single byte field followed by a zero byte payload and single byte CRC 626. The command response 622 in this case is a unique sequence of bits that corresponds to the unique command 804. The CRC 626 is a CRC of the command response 622.

It should be recognized that embodiments are not limited to the response sequence 620 depicted in FIG. 6A, but rather other response data structures may be used. For example, response sequence 620 may include a payload having a size greater than zero bytes, where the payload may include a variety of information as described herein.

FIG. 7A illustrates a detailed structure for a portion of a command sequence 700 for requesting a state of an accessory. Command 704 corresponds to command 404, and CRC 708 corresponds to CRC 408. The command 704 is a single byte field followed by a zero byte payload which is followed by a single byte CRC 708. The command 704 in this embodiment is a request for the state of one or more operations of the accessory. The CRC 708 is a CRC of the command field 704.

FIG. 7B illustrates a detailed structure of a response sequence 720 for responding to a request for a state of the accessory. Command response 722 corresponds to command response 422, payload 724 corresponds to payload 406, and CRC 726 corresponds to CRC 426. The command response 722 is a single byte field followed by a four byte payload 724 and single byte CRC 726. The command response 722 in this case is a unique sequence of bits that corresponds to the unique command 704. The CRC 726 is a CRC of the command response 722 and payload 724. The payload 724 in this case is a current state field that indicates a current state of one or more operations of the accessory.

In accordance with the embodiment depicted in FIG. 7B, the current state field 724 is configured to indicate the current state of two operations of the accessory: charge current and command passthrough. Specifically, the current state field 724 includes PH bit 730 which indicates a state of how the accessory controls the amount of charge current the accessory provides the host device. For example, accessory hardware 310 may provide power from a power source to electronic device 302 and, as previously described, may include impedance altering circuitry. The PH bit 730 may indicate to the host device a current state of the impedance altering circuitry. For example, a particular PH bit 730 value may indicate that the accessory has enabled its impedance altering circuitry so as to limit the amount of current provided to the electronic device. A different particular PH bit 730 value may indicate that the accessory has disabled its impedance altering circuitry so that the amount of current provided to the electronic device from the power source is not limited.

The current state field 724 also includes PT bit 731 which indicates a state of how the accessory controls which internal circuitry of the accessory receives commands communicated from the host device. For example, the ID module 308 operates to receive commands over an ID contact 322 and may comprise one physical chip. The PT bit 731 may indicate to the host device whether commands communicated to the ID module 308 are communicated from the ID module to other physical chips of the accessory. For example, the PT bit 731 may indicate whether commands pass through the ID module 308 to the accessory hardware 310. For example, a particular PT bit 731 value 0 may indicate that passthrough is disabled such that the accessory does not forward subsequently received commands to other components of the accessory. A different particular PT bit 611 value may indicate that passthrough is enabled such that the accessory does forward subsequently received commands (in some cases including related information such as a corresponding payload, CRC, etc.) to other components of the accessory (e.g., accessory hardware 310).

The current state field 724 also includes other bits 732, which may be used to indicate a current state of one or more other operations of the accessory. The other bits 732 are depicted as comprising three bytes, but could include more or fewer than three bytes. Moreover, one or more of the other bits 732 could be arranged elsewhere within the current state field 724. For example, one or more of other bits 732 could be arranged between PH bit and PT bit, behind PH bit and/or PT bit, and/or in front of PH bit and/or PT bit.

In some embodiments, the current state field 724 may also indicate whether certain capabilities are supported by the accessory. For example, the current state field 724 may include an SPH bit 733 that indicates whether the accessory is capable of altering its impedance (e.g., a particular SPH bit value may indicate that the accessory is incapable of altering its impedance, whereas another particular SPH bit value may indicate that the accessory is capable of altering its impedance). For another example, the current state field 724 may also or alternatively include an SPT bit 734 that indicates whether the accessory is capable of passthrough (e.g., a particular SPT bit value may indicate that the accessory is incapable of passing commands through the ID Module 308 to other components of the accessory, whereas another particular SPT bit value may indicate that the accessory is capable of passing commands through the ID Module 308 to other components of the accessory). The current state field 724 need not be limited to indicating whether the accessory is capable of these operations, but may also indicate or alternatively indicate whether the accessory is capable of other operations.

It should be recognized that embodiments are not limited to PH bit 730, and PT bit 731, SPH bit 733, and SPT bit 734 being one bit in size or arranged in the order depicted in FIG. 7B, but rather they could be greater than one bit in size, arranged in different orders (e.g., the PT bit 731 as the highest significant bit or the lowest significant bit), or arranged at different locations within the current state field 724 (e.g., at the highest significant bits, the lowest significant bits or somewhere in between the lowest significant bits and highest significant bits). Moreover, one or more bits in current state field 724 may be operable to indicate the current state or capability for more, fewer, or different operations of the accessory than those described with reference to FIG. 7B.

Figure 8:
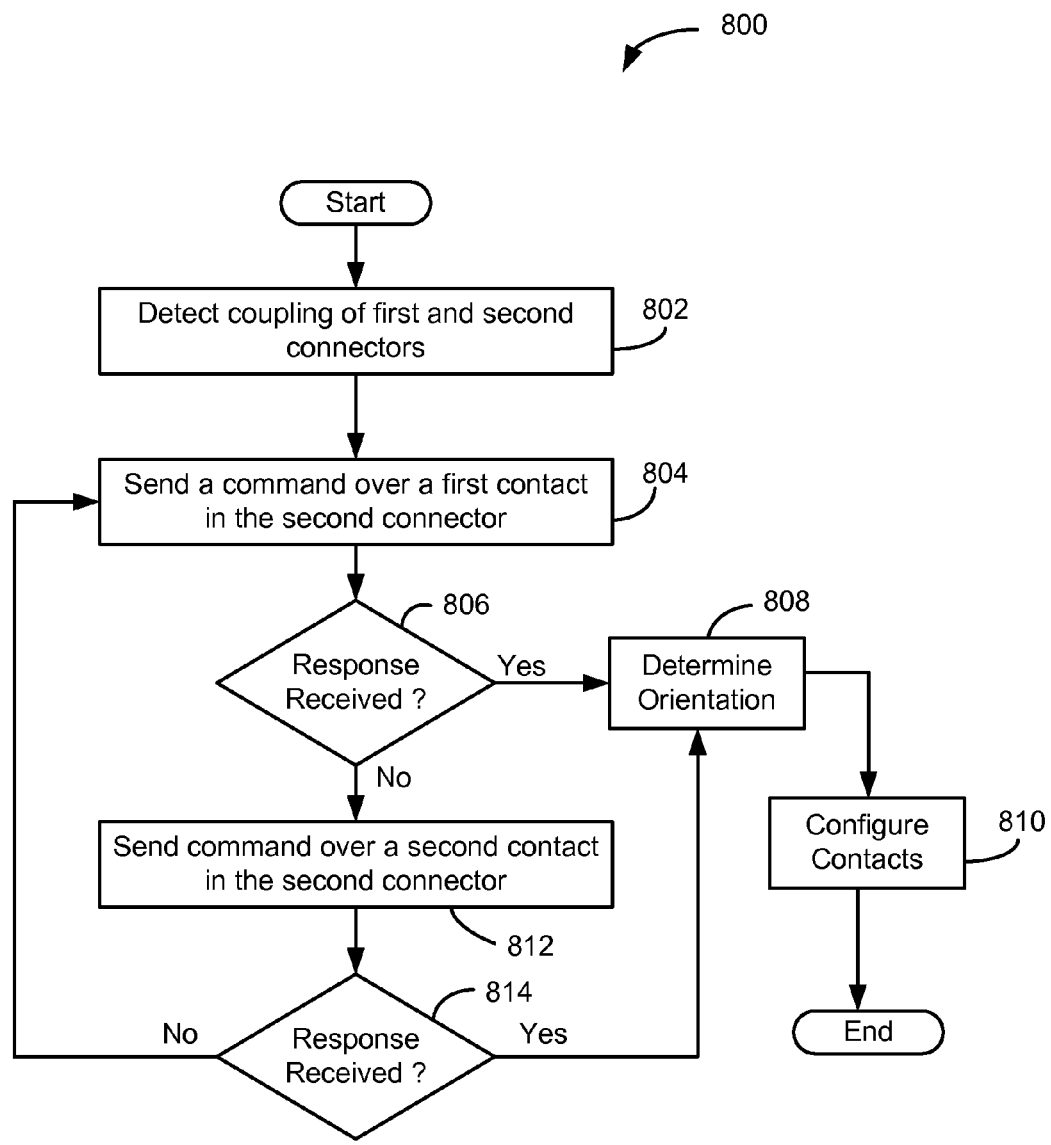
FIG. 8 is a flow diagram of a process for configuring contacts of a multi-orientation connector according to an embodiment of the present invention.

FIG. 8 is a flow diagram of a process 800 for configuring contacts of a multi-orientation connector according to an embodiment of the present invention. Process 800 may be performed, e.g., by device 302 of FIG. 3.

At block 802, the device may detect coupling of the accessory (first) connector with its own (second) connector. In other words, the device may detect that the accessory connector has been physically coupled to its own connector, e.g., via the connector detector contact in its connector. Once the device determines that the accessory connector is physically coupled to its connector, the device may, via the microcontroller, send a command over a first contact of its connector, e.g., the ACC_1 contact described above at block 804. For example, the device may send the request command sequence described with reference to any of FIGS. 4A, 5A, 6A, and 7A. Once the command is sent, the device may wait for a response to the command from the accessory. At block 806, the device may check whether a response to the command was received from the accessory over the first contact. If a response is received over the first contact, the device may determine the orientation of the accessory connector with respect to its own connector at block 808. For instance, based on the response, the device now knows which contact in its connector is coupled to the ID module and can designate that line as the ID bus. Once the ID bus is known, the device can determine the orientation in which the accessory connector is plugged in. Once the orientation is known, the device may configure the rest of the contacts of the second connector based on the determined orientation (810). For example, the response sequence described with reference to any of FIGS. 4B, 5B, 6B, and 7B may be received on contact ACC_1. In the case where the command and response structures as described with reference to FIGS. 5A and 5B are used, microcontroller 312 may read the contents of ACCx bits 531 and configure switch ACC_1 316 and switch ACC_2 318 using the contents of ACCx bits 531.

If at block 806 the device receives no response to the command, the device can send the same command over a second contact in its connector at block 812. At block 814 the device can again check to see if a valid response is received for the command over the second contact. If a valid response is received, process 800 proceeds to blocks 808 and 810 as described above and the device configures the rest of the contacts in its own (second) connector. For example, the response sequence described with reference to FIG. 5B may be received on contact ACC_2. Microcontroller 312 may read the contents of ACCx bits 531. Since the response sequence was received on contact ACC_2, microcontroller 312 may configure switch ACC_1 316 and switch ACC_2 318 using the contents of ACCx bits 531 where the switches ACC_1 316 and ACC_2 318 may be configured differently than when the response was received on contact ACC_2.

If no response is received at block 814, the process returns to block 804 where the device sends the same command over the first contact again. Thus, the device alternately sends the command over the first and the second contacts until it receives a valid response on one of the contacts. In some embodiments, process 800 may be programmed to time out after a certain duration or after a certain number of attempts.

It should be appreciated that the specific steps illustrated in FIG. 8 provide a particular method of configuring contacts of a multi-orientation connector according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. In particular, several steps may be omitted in some embodiments. One of ordinary skill in the art would recognize many variations, modifications, and alternatives.

Figure 9:
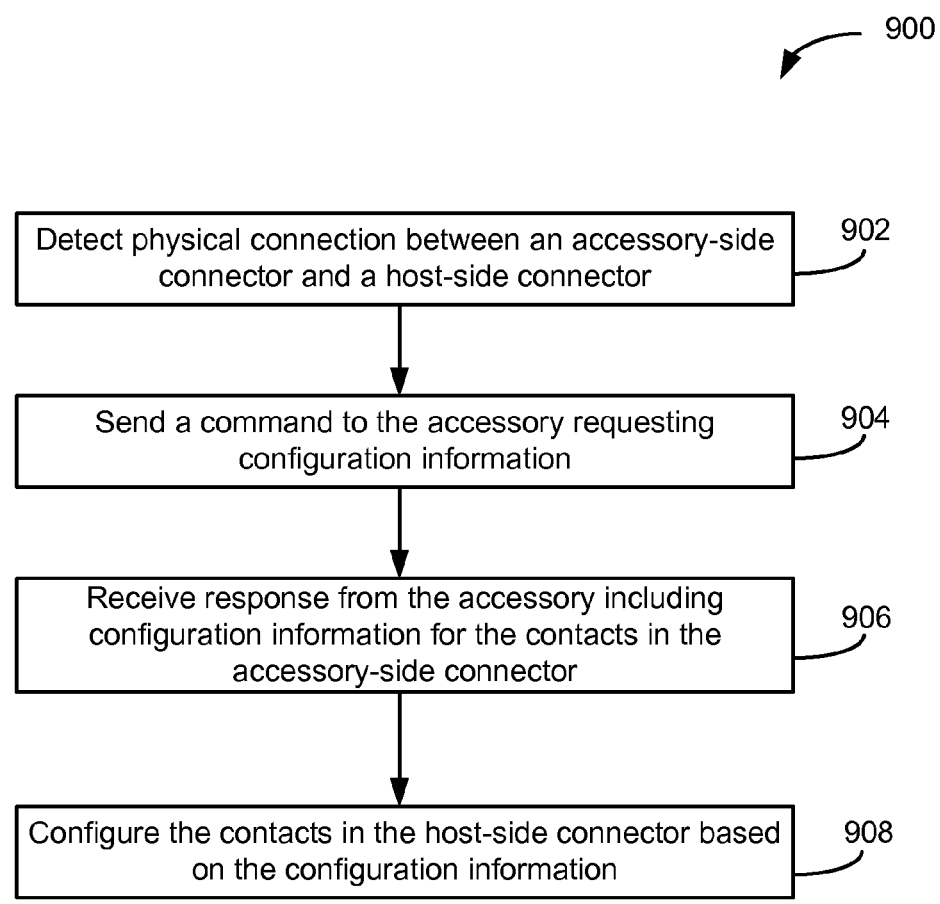
FIG. 9 is a flow diagram of a process for configuring contacts of a single-orientation connector according to an embodiment of the present invention.

FIG. 9 is a flow diagram of a process 900 for configuring contacts of a single-orientation connector according to an embodiment of the present invention. Process 900 can be performed, e.g., by device 302 of FIG. 3.

The host device detects physical connection between the host-side connector and the accessory-side connector (902). Connection detection according to one embodiment is described in co-owned U.S. patent application Ser. No. 13/607,550, titled "TECHNIQUES FOR CONFIGURING CONTACTS OF A CONNECTOR", filed on Sep. 7, 2012, the contents of which are incorporated by reference herein in their entirety for all purposes. Once the two connectors are physically connected, the host device may send a command to the accessory requesting the accessory to provide configuration information about the contacts on the accessory-side connector (904). In some embodiments, the host device need not even request this information and the accessory may automatically provide this information upon determination of physical connection between the two connectors. For example, the host device may send the request command sequence described with reference to FIG. 5A. The host device receives the contact configuration information from the accessory (906). For example, the host device may receive the response sequence described with reference to FIG. 5B. The contact configuration information enables the host device to determine the functionality associated with each contact in the accessory-side connector. Based on this information, the host device configures contacts in the host-side connector to match the functionality of the corresponding accessory-side connector contacts (908). For example, the host device may configure PIN_1 through PIN_4 using the pin selection field 530 (FIG. 5B). In some embodiments, the host device may operate switches 1-N (and/or switches ACC_1 and ACC_2) illustrated in FIG. 3 to impart the appropriate functionality to some of the contacts in the host-side connector. For example, the host device may connect SWITCH 1 through SWITCH 4 to the appropriate communication circuitry 330 and/or power circuitry (not shown) based on the contents of the pin selection field 530.

It should be appreciated that the specific steps illustrated in FIG. 9 provide a particular method for configuring contacts of a single-orientation connector according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. In particular, several steps may be omitted in some embodiments. One of ordinary skill in the art would recognize many variations, modifications, and alternatives.

Figure 10:
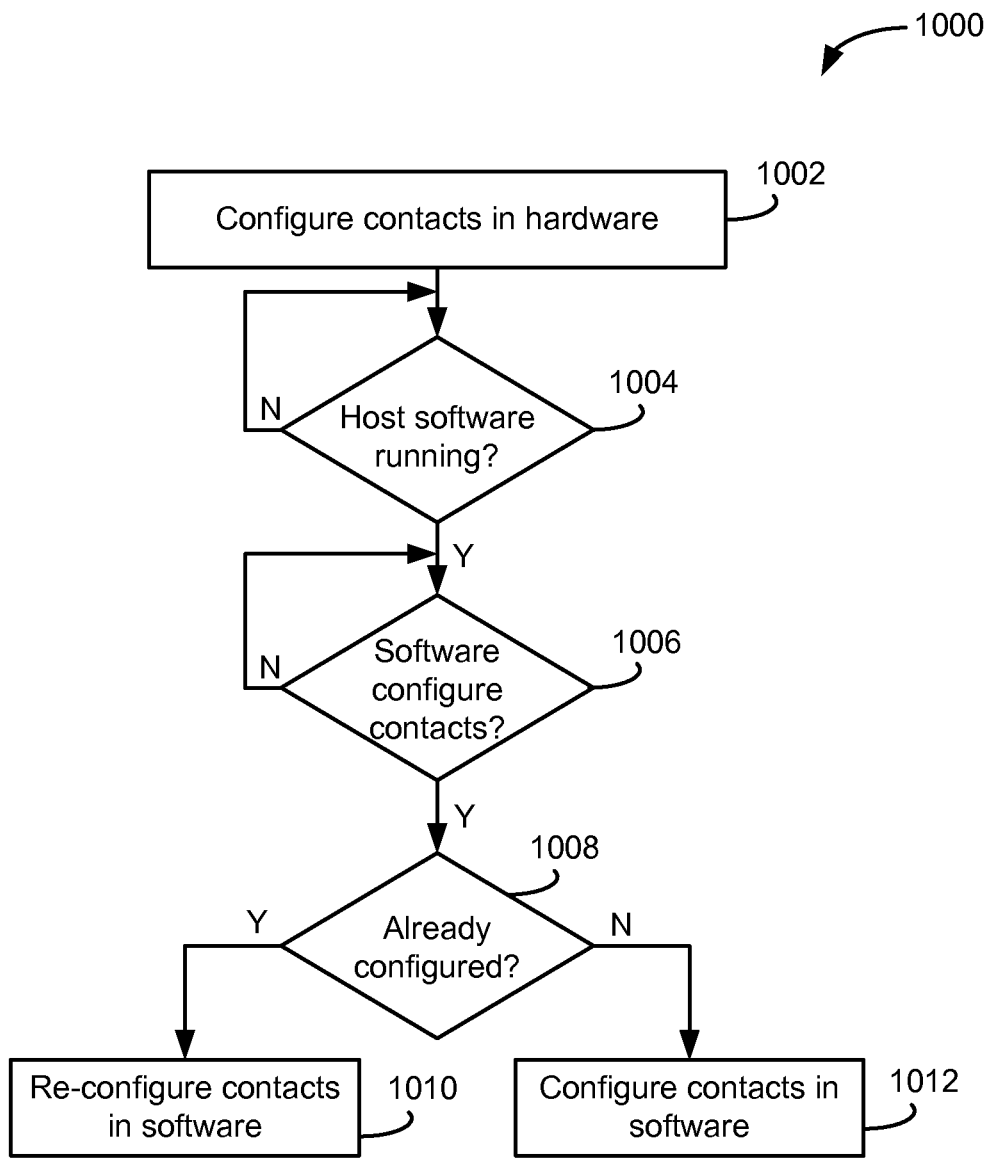
FIG. 10 is a flow diagram of a process for performing software and hardware-based contact configuration according to an embodiment of the present invention.

FIG. 10 is a flow diagram of a process 1000 for performing software and hardware-based contact configuration according to an embodiment of the present invention. Process 1000 may be performed, e.g., by device 302 of FIG. 3, and may, in some embodiments, be implemented at block 810 (FIG. 8) and/or block 908 (FIG. 9).

At block 1002, the host device configures its contacts in hardware. For example, one or more components of device 302, such as microcontroller 312, may be implemented in a hardware state machine that, in some embodiments, may be operable even when the device 302 is incapable of executing software (e.g., via processor 340). Even though the device 302 is (at least temporarily) incapable of executing software, device 302 may still be able to configure one or more of its pins for, e.g., debugging purposes. Microcontroller 312 may receive a command response with pin configuration information, such as the response sequence 520 including pin selection field 530. Microcontroller 312 may read only a portion of the pin selection field 530, such as the ACCx bits 531, the DB bits 534, and at least one of the USB bits 532. Microcontroller 312 may then configure its pins (i.e., by configuring Switches 1-4, ACC_1 and ACC_2) based on the states of those bits.

At block 1004, device 302 determines whether software is running on the device for configuring or re-configuring the pins, such as software executed by processor 340. If no software is executing, then the microcontroller will maintain the pin configuration defined in by the above-mentioned bits for configuring the pins in hardware. Otherwise, processing will move to block 1006.

At block 1006, device 302 determines whether any of the pins are to be configured by the software. For example, software executed by processor 340 may be programmed to configure one or more of PIN_1 through PIN_4, ACC_1, and ACC_2. If the software is not programmed to configure one or more of the pins, then the hardware-based pin configuration will be maintained. Otherwise, processing will move to block 1008.

At block 1008, device 302 determines whether the pins which are to be configured by software have already been configured in hardware. For example, the software may be programmed to configure PIN_1, where PIN_1 may have or may have not already been configured in hardware. When the pins have already been configured in hardware, then processing moves to block 1010 where the hardware-configured pins are re-configured by the software. For example, PIN_1 and PIN_2 may be initially configured in hardware to couple to USB circuitry to facilitate USB communication, and may then be reconfigured in software to couple to UART circuitry to facilitate UART communication. When the pins have not been configured in hardware, then processing moves to block 1012 where the pins are configured by the software. For example, ACC_2 may not be initially configured in hardware (e.g., left in a high impedance state), and may then be configured in software to couple to a power source of the host device.

It should be appreciated that the specific steps illustrated in FIG. 10 provide a particular method of performing software and hardware-based contact configuration according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. In particular, several steps may be omitted in some embodiments. One of ordinary skill in the art would recognize many variations, modifications, and alternatives.

Circuits, logic modules, processors, and/or other components can be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various non-transitory computer readable storage media; suitable media include magnetic disk or tape, optical storage media, such as compact disk (CD) or DVD (digital versatile disk), flash memory, and the like. Computer readable storage media encoded with the program code can be packaged with a compatible device or provided separately from other devices. In addition program code can be encoded and transmitted via wired optical, and/or wireless networks conforming to a variety of protocols, including the Internet, thereby allowing distribution, e.g., via Internet download.

Thus, although the invention has been described with respect to specific embodiments, it will be appreciated that the invention is intended to cover all modifications and equivalents within the scope of the following claims.

What is claimed is:

1. An accessory, comprising:
a connector for mating with an electronic device having a plurality of electronic device pins, the connector including a plurality of accessory pins for engaging the electronic device pins upon mating, the accessory pins comprising a first row of pins including: a first identification bus pin; a first pair of data pins arranged beside the first identification bus pin; a first electronic device power pin arranged beside the first pair of data pins; a second identification bus pin arranged beside the first electronic device power pin; a second pair of data pins arranged beside the second identification bus pin; and a first electronic device ground pin arranged beside the second pair of data pins;
communication circuitry coupled to at least one of the accessory pins for communicating information between the accessory and the electronic device; and
a memory operable to store a data structure, the data structure including a command response field and a payload field, wherein:
the command response field defines a response to a command communicated to the accessory by the electronic device; and
the payload field includes a pin selection field operable to cause the electronic device to identify at least one of the electronic device pins and cause the electronic device to perform at least one operation including: selecting one of a plurality of communication protocols for communicating with the accessory over the identified pin and at least one of the first pair of data pins and the second pair of data pins; and providing power to the accessory over the identified pin and one of the first identification bus pin and the second identification bus pin;
wherein the accessory pins further comprise a second row of pins including:
a second electronic device ground pin arranged opposite the first identification bus pin; a third pair of data pins arranged opposite the first pair of data pins; a third identification bus pin arranged opposite the first electronic device power pin; a second electronic device power pin arranged opposite the second identification bus pin; a fourth pair of data pins arranged opposite the second pair of data pins; and a fourth identification bus pin arranged opposite the first electronic device ground pin.

2. The accessory of claim 1 wherein the pin selection field is operable to cause, when the first row of accessory pins are mated with the electronic device pins, the electronic device to identify the electronic device pin mated with the second identification bus pin and provide power to the accessory via the second identification bus pin.

3. The accessory of claim 1 wherein the pin selection field is operable to cause, when the first row of accessory pins are mated with the electronic device pins, the electronic device to identify the first pair of data pins and select one of the plurality of communication protocols to communicate with the accessory over the first pair of data pins, and wherein the communication circuitry of the accessory is operable to communicate over the first pair of data pins using the selected communication protocol.

4. The accessory of claim 1 wherein the pin selection field is operable to further indicate to the electronic device whether the accessory is operable to communicate with the electronic device over at least a second one of the electronic device pins using a second one of the plurality of communication protocols.

5. The accessory of claim 4 wherein the at least one of the electronic device pins is a first pair of data pins and the at least a second one of the electronic device pins is a second pair of data pins, different from the first pair of data pins and wherein the pin selection field is operable to select a first communication protocol for communicating with the first pair of data pins and select the second communication protocol for communicating with the second pair of data pins.

6. The accessory of claim 1 wherein the pin selection field includes a first subfield that indicates whether or not the accessory includes circuitry that enables the accessory to communicate using a USB protocol, a second subfield that indicates whether or not the accessory includes circuitry that enables the electronic device to communicate using a UART communication protocol, and a third subfield that indicates whether or not the accessory is used for debugging the electronic device.

7. The accessory of claim 6 wherein the first subfield further indicates whether the electronic device should act as a host or slave.

8. The accessory of claim 6 wherein the second subfield further indicates a speed of a UART controller in the accessory.

9. The accessory of claim 6 wherein the pin selection field further includes a fourth subfield that indicates whether the accessory includes an audio and/or video data transfer bus.

10. The accessory of claim 6 wherein the payload field further includes an accessory capability field operable to define a plurality of capabilities of the accessory.

11. The accessory of claim 10 wherein the accessory capability field identifies whether power is supplied from the electronic device to the accessory.

12. The accessory of claim 11 wherein the accessory capability field further identifies whether the accessory may continue normal operation when power is removed the electronic device.

* * * * *